(12) United States Patent
Wakabayashi

(10) Patent No.: US 10,791,563 B2
(45) Date of Patent: *Sep. 29, 2020

(54) METHOD AND APPARATUS FOR REPORTING CHANNEL STATE INFORMATION IN WIRELESS COMMUNICATION SYSTEM

(71) Applicant: SONY CORPORATION, Tokyo (JP)

(72) Inventor: Hideji Wakabayashi, Reading (GB)

(73) Assignee: SONY CORPORATION, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 15/891,643

(22) Filed: Feb. 8, 2018

(65) Prior Publication Data

US 2018/0167954 A1    Jun. 14, 2018

Related U.S. Application Data

(63) Continuation of application No. 14/650,941, filed as application No. PCT/GB2014/050137 on Jan. 17, 2014, now Pat. No. 9,930,681.

(30) Foreign Application Priority Data

Jan. 21, 2013  (GB) .................................. 1301039.2

(51) Int. Cl.
*H04W 72/08* (2009.01)
*H04L 5/00* (2006.01)
(Continued)

(52) U.S. Cl.
CPC ........ *H04W 72/085* (2013.01); *H04B 7/0632* (2013.01); *H04L 1/003* (2013.01);
(Continued)

(58) Field of Classification Search
CPC .... H04W 72/085; H04L 5/0053; H04L 1/003; H04L 25/0222; H04L 25/022;
(Continued)

(56) References Cited

U.S. PATENT DOCUMENTS

2008/0117867 A1   5/2008  Yin et al.
2008/0207135 A1   8/2008  Varadarajan et al.
(Continued)

FOREIGN PATENT DOCUMENTS

CN   101867447 A   10/2010
CN   102017483 A   4/2011
(Continued)

OTHER PUBLICATIONS

Examination Report issued in British Application GB1301039.2 dated Aug. 30, 2018.
(Continued)

*Primary Examiner* — Peter P Chau
(74) *Attorney, Agent, or Firm* — Xsensus LLP

(57) ABSTRACT

Sub-band CQI reports are introduced for LTE systems having system bandwidth of narrow band, e.g. less than or equal to 6 resource blocks, which address issues pertinent to such narrowband systems. Three related methods are described: fixed, semi-static and adaptive sub-band size. To varying degrees they are each specified in accordance with the channel condition.

11 Claims, 25 Drawing Sheets

(51) Int. Cl.
*H04B 7/06* (2006.01)
*H04L 1/00* (2006.01)
*H04L 25/02* (2006.01)

(52) U.S. Cl.
CPC .......... *H04L 1/0026* (2013.01); *H04L 5/0007* (2013.01); *H04L 5/0053* (2013.01); *H04L 25/022* (2013.01); *H04L 25/0212* (2013.01); *H04L 25/0222* (2013.01)

(58) Field of Classification Search
CPC . H04L 25/0212; H04L 1/0026; H04L 5/0007; H04B 7/0632
See application file for complete search history.

(56) References Cited

U.S. PATENT DOCUMENTS

| | | |
|---|---|---|
| 2009/0154588 A1 | 6/2009 | Chen et al. |
| 2010/0098012 A1* | 4/2010 | Bala ................. H04L 5/001 370/329 |
| 2011/0034198 A1 | 2/2011 | Chen et al. |
| 2011/0103335 A1 | 5/2011 | Golitschek et al. |
| 2011/0134771 A1 | 6/2011 | Chen |
| 2011/0165846 A1 | 7/2011 | Zheng et al. |
| 2011/0237282 A1 | 9/2011 | Geirhofer et al. |
| 2012/0020230 A1 | 1/2012 | Chen et al. |
| 2012/0057499 A1 | 3/2012 | Pedersen et al. |
| 2012/0076028 A1 | 3/2012 | Ko et al. |
| 2012/0155480 A1 | 6/2012 | Stenfelt |
| 2012/0320778 A1 | 12/2012 | Lv et al. |
| 2013/0064128 A1 | 3/2013 | Li et al. |
| 2013/0294393 A1 | 11/2013 | Park et al. |
| 2014/0050107 A1* | 2/2014 | Charbit ............. H04W 72/1289 370/252 |

FOREIGN PATENT DOCUMENTS

| | | |
|---|---|---|
| CN | 102113258 A | 6/2011 |
| CN | 102307081 A | 1/2012 |
| CN | 102461240 A | 5/2012 |
| CN | 102845009 A | 12/2012 |
| GB | 2487908 A | 5/2012 |
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487909 A | 8/2012 |
| GB | 2488513 A | 9/2012 |
| GB | 2493703 A | 2/2013 |
| GB | 2497743 A | 6/2013 |
| TW | 201134124 A1 | 10/2011 |
| WO | 2008/103979 A2 | 8/2008 |
| WO | 2008/120920 A1 | 10/2008 |
| WO | 2011/041759 A1 | 4/2011 |
| WO | 2012/102479 A2 | 8/2012 |
| WO | 2013/091535 A1 | 6/2013 |

OTHER PUBLICATIONS

International Search Report dated Jun. 13, 2014 in PCT/GB2014/050137.
Search Report dated Jul. 24, 2013 in United Kingdom Patent Application No. 1301039.2.
"Digital cellular telecommunications system (Phase 2+); Universal Mobile Telecommunicatons System (UMTS); LTE; Service Requirements for Machine-Type Communications (MTC); Stage 1" ETSI TS 122 368, Jul. 2011, pp. 1-17 (with Cover Page).
Office Action dated Aug. 2, 2017 in Chinese Patent Application No. 201480005574.6 (with computer generated English translation).
Combined Taiwanese Office Action and Search Report dated Aug. 20, 2015 in Patent Application No. 102145865 (with English translation of categories of cited documents).
TSG-RAN Working Group 4 (Radio) meeting #43, "R4-070572: Proposal for LTE channel models" Ericsson; Nokia; Motorola, Rohde & Schwarz, May 7-11, 2007, 7 Pages.
Office Action dated Jun. 28, 2019, issued in corresponding Indian Patent Application No. 4889/DELNP/2015, with English translation 5 pages.
Korean Office Action dated Mar. 24, 2020, issued in corresponding Korean Patent Application No. 10-2015-7019137.

* cited by examiner

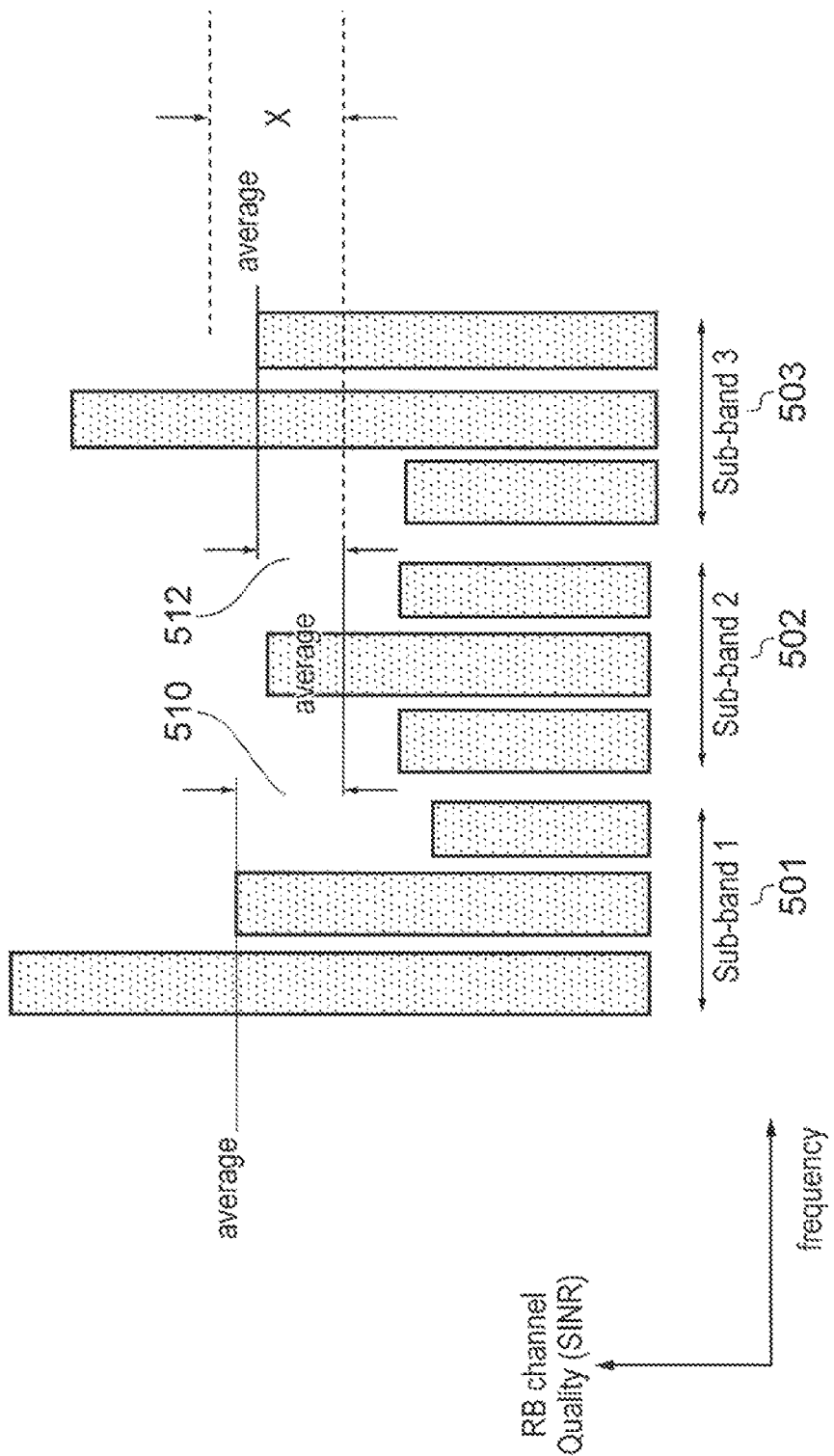

METHOD AND APPARATUS FOR REPORTING CHANNEL STATE INFORMATION IN WIRELESS COMMUNICATION SYSTEM

CROSS-REFERENCE TO RELATED APPLICATIONS

The present application is a continuation of U.S. application Ser. No. 14/650,941, filed Jun. 10, 2015, which is a National Stage of International Application No. PCT/GB2014/050137 filed Jan. 17, 2014, and claims priority to British Patent Application No. 1301039.2, filed in the U.K. Jan. 21, 2013, the entire contents of each of which being incorporated herein by reference.

BACKGROUND OF THE INVENTION

The present invention relates to telecommunications apparatus, methods, systems and apparatus for transmitting data to and/or receiving data from mobile terminals in a wireless communications system. In particular, the invention relates to reporting of channel state information in wireless communications systems.

Channel state information may be of particular relevance to the effective operation of machine type communication (MTC) devices in cellular telecommunications networks having orthogonal frequency division multiplex (OFDM) based radio access technology (such as WiMAX and LTE).

One of the key issues to be considered in the development of radio technology is fading. Fading can affect radio propagation in many ways: a receiver may receive multipath signals (taps) which show the effects of attenuation, time delay and phase shift. In order to overcome fading, link adaptation techniques are widely used for wireless communication.

In order to use link adaptation, channel state information (such as the channel quality indicator (CQI) introduced in LTE) needs to be obtained for each UE. CQI is the feedback of a measure of downlink channel quality from mobile terminal (e.g. user equipment, UE) to base station (e.g. eNodeB).

SUMMARY OF THE INVENTION

According to a first aspect of the invention there is provided a method for reporting channel state information corresponding to a communication link between a terminal device and a base station in a wireless communications system, the wireless communication system having a system bandwidth divided into a plurality of sub-band parts having at least one characteristic sub-band size, the method comprising:

providing a plurality of communications resource elements across the system bandwidth;

measuring one or more channel state parameter corresponding to the channel state in one or more of the communications resource elements;

generating aggregate channel state information from at least one measured channel state parameter corresponding to the channel state of the communications resource elements, generating sub-band channel state information from at least one measured channel state parameter corresponding to the channel state of the communications resource elements within respective sub-band parts, wherein the size of the sub-band part is dependent upon radio propagation conditions.

The channel state information may preferably be a channel quality indicator (CQI). As a result, sub-band size is altered depending on the degree of the channel quality fluctuation in frequency domain (e.g. subcarrier or RBs). When the channel is flat, large sub-band size (max case wideband CQI) is selected.

Conveniently, the plurality of sub-band parts may have a plurality of characteristic sub-band sizes, at least a first group of the sub-band parts having a first characteristic sub-band size and a second group of the sub-band parts having a second characteristic sub-band size, the first characteristic sub-band size and second characteristic sub-band size being different, thereby facilitating reporting channel state information at different degrees of granularity for different parts of the system bandwidth. Thus within a (wide band) host carrier, the sub-band size is adaptively selected depending on fluctuation of channel quality.

This makes it possible to provide fine resolution frequency scheduling and better performance of throughput for narrowband carriers and allows an efficient MTC Virtual carrier (narrow band) operation in host carrier.

Furthermore the method facilitates the indication of the sub-band size that has been configured.

As a result of the method, the sub-band size is preferably selected in dependence on the presence and degree of frequency selective fading.

The method provides not only wideband CQI, but also fine resolution sub-band CQI for narrowband carriers such as the virtual carrier subsystem described below.

Various further aspects and embodiments of the invention are provided in the accompanying independent and dependent claims.

It will be appreciated that features and aspects of the invention described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF DRAWINGS

Embodiments of the present invention will now be described by way of example only with reference to the accompanying drawings, where like parts are provided with corresponding reference numerals and in which:

FIG. 5 illustrates the subcarrier SINR method for determining the sub-band size change in accordance with an embodiment of the invention;

DETAILED DESCRIPTION

Figure 1:
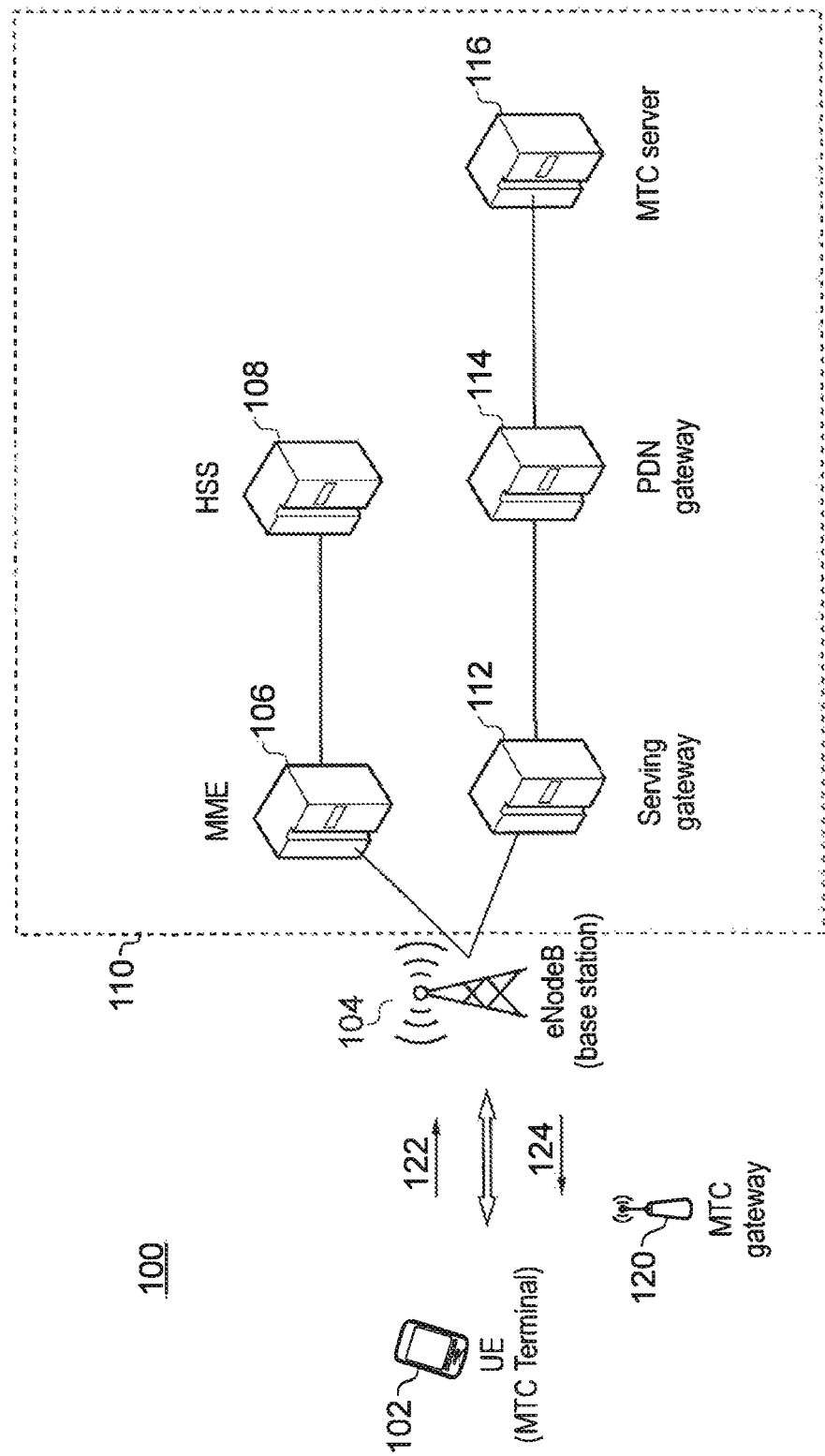
FIG. 1 illustrates schematically certain functional elements of a conventional mobile telecommunications network.

FIG. 1 provides a schematic diagram illustrating some basic functionality of a conventional mobile telecommunications network, using for example Long Term Evolution (LTE) architecture.

The network includes a plurality of base stations 104 (only one is shown for simplicity) connected to a core network 110 (in dotted box). Each base station 104 provides a coverage area (i.e. a cell) within which data can be communicated to and from terminal devices (also referred to as mobile terminals, MT or User equipment, UE) 102. Data is transmitted from base stations 104 to terminal devices 102 within their respective coverage areas via a radio downlink 124. Data is transmitted from terminal devices 102 to the base stations 104 via a radio uplink 122.

The core network 110 routes data to and from the terminal devices 102 via the respective base stations 104 and provides functions such as authentication, mobility management, charging and so on. Typical entities in a core network include a Mobility Management Entity, MME, 106 and a subscriber database (HSS) 108: these entities facilitate the provision of communications services to UEs wherever they are located within the coverage of the network. Access to data services is provided by a serving gateway 112 and a packet data network, PDN, gateway 114.

FIG. 1 also shows elements which extend the network to allow efficient management of machine type communication (MTC) devices. The illustrated core network 110 incorporates an MTC server 116. An optional MTC gateway 120 is also shown in FIG. 1: such a gateway may provide a hub terminal device which is in communication with one or more MTC devices and in turn establishes uplink and/or downlink communication paths with the base stations 104 on behalf of the connected MTC devices.

Throughout this disclosure, the term "MTC server" refers to an MTC server of the type defined in 3GPP TS 22.368 [1]: the definition there being of a server, which communicates to a public land mobile network (PLMN) [i.e. a mobile telecommunications network] and to MTC Devices through the PLMN. The MTC Server also has an interface which can be accessed by the MTC User. The MTC Server performs services for the MTC User.

In mobile telecommunications systems such as those arranged in accordance with the 3GPP defined Long Term Evolution (LTE) architecture, communication between base stations (e.g. eNodeB 104) and communications terminals (e.g. UE 102, MTC gateway 120) is conducted over a wireless air-interface, Uu. Downlink 124 on the Uu interface uses an orthogonal frequency division multiple access (OFDMA) technology, while uplink 122 uses single carrier frequency division multiple access (SC-FDMA) technology. In both cases, the system bandwidth is divided into a plurality of "subcarriers" (each occupying 15 kHz).

The downlink Uu interface organises resources in time using a "frame" structure. A downlink radio frame is transmitted from an eNode B and lasts 10 ms. The downlink radio frame comprises ten subframes, each subframe lasting 1 ms. The subframe in turn comprises a predetermined number of "symbols", which are each transmitted over a respective 1/14 ms period. Each symbol comprises a predetermined number of orthogonal subcarriers distributed across the bandwidth of the downlink radio carrier.

To take a specific example, a subframe may be defined to have 14 symbols and 1200 subcarriers spread across a 20 MHz bandwidth. User data is allocated for transmission by the scheduler of the eNodeB in "resource blocks" (RB) comprising twelve subcarriers.

When compared with serial data transmission techniques, OFDM techniques are considered to be tolerant of delay spread as a consequence of the comparatively long time duration of the symbols. Nevertheless, there are circumstances when this tolerance is insufficient.

Over the time scales of OFDM signals, fading in the frequency domain can be relatively flat. Frequency selective fading does arise where cells are relatively large and/or cover certain disruptive features in the natural or built environment: a cell covering a large dense urban district with a high proportion of mobile UEs would typically experience greater delay spread than a cell covering a sparsely populated plain. In order to overcome fading, link adaptation techniques are widely used for wireless communication.

In order to use link adaptation, channel state information (such as the channel quality indicator (CQI) introduced in LTE) needs to be obtained for each UE. CQI is the feedback of a measure of downlink channel quality from mobile terminal (e.g. user equipment, UE) to base station (e.g. eNodeB).

Coherence Bandwidth and Delay Spread

Excessive delay may impact on ISI (Inter-symbol-Interference) and it may cause frequency selective fading.

Figure 22:
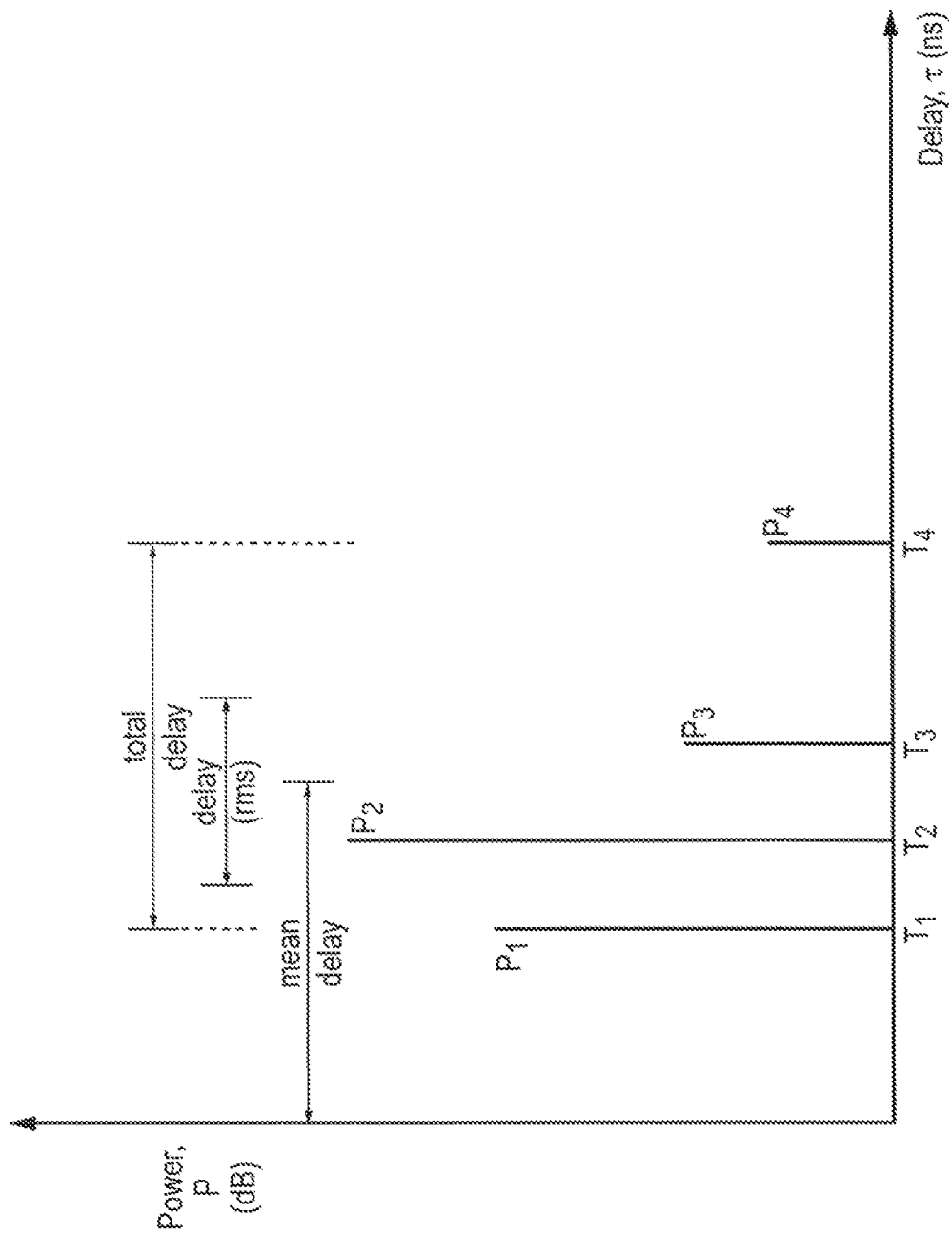
FIG. 22 illustrates the power delay profile for a multipath signal having a plurality of taps.

For a multipath signal, an example power delay profile might look like FIG. 22. Here, the power in a received signal, P(t), is received as N(=4) taps: $P_1(t)$ to $P_N(t)$.

In the literature, the term "excess delay" is the delay of any tap relative to the first tap. Likewise, the term "total delay" is the delay difference between first and last tap. Total power, $P_T$, is the sum of all the tap powers, i.e.

$$P_T = \sum_{i=1}^{N} P_i$$

Mean delay, $\tau_0$, is defined as the average delay weighted by power $$\tau_0 = \frac{1}{P_T} \sum_{i=1}^{N} P_i \tau_i$$

One of the key parameters for wireless propagation characteristics is the delay spread. Delay spread is a standard deviation (or root-mean-square, r.m.s.) value of the averaged $$\tau_{rms} = \sqrt{\frac{1}{P_T} \sum_{i=1}^{N} P_i \tau_i^2 - \tau_0^2}$$

multipath delay. The root mean squared (rms) delay spread, $\tau_{rms}$, is in turn defined using the concept of the mean delay, as follows:

As the rms delay spread is a characteristic that can be calculated in many different radio conditions, the rms delay spread is used to allow comparison of various environments.

Figure 23:
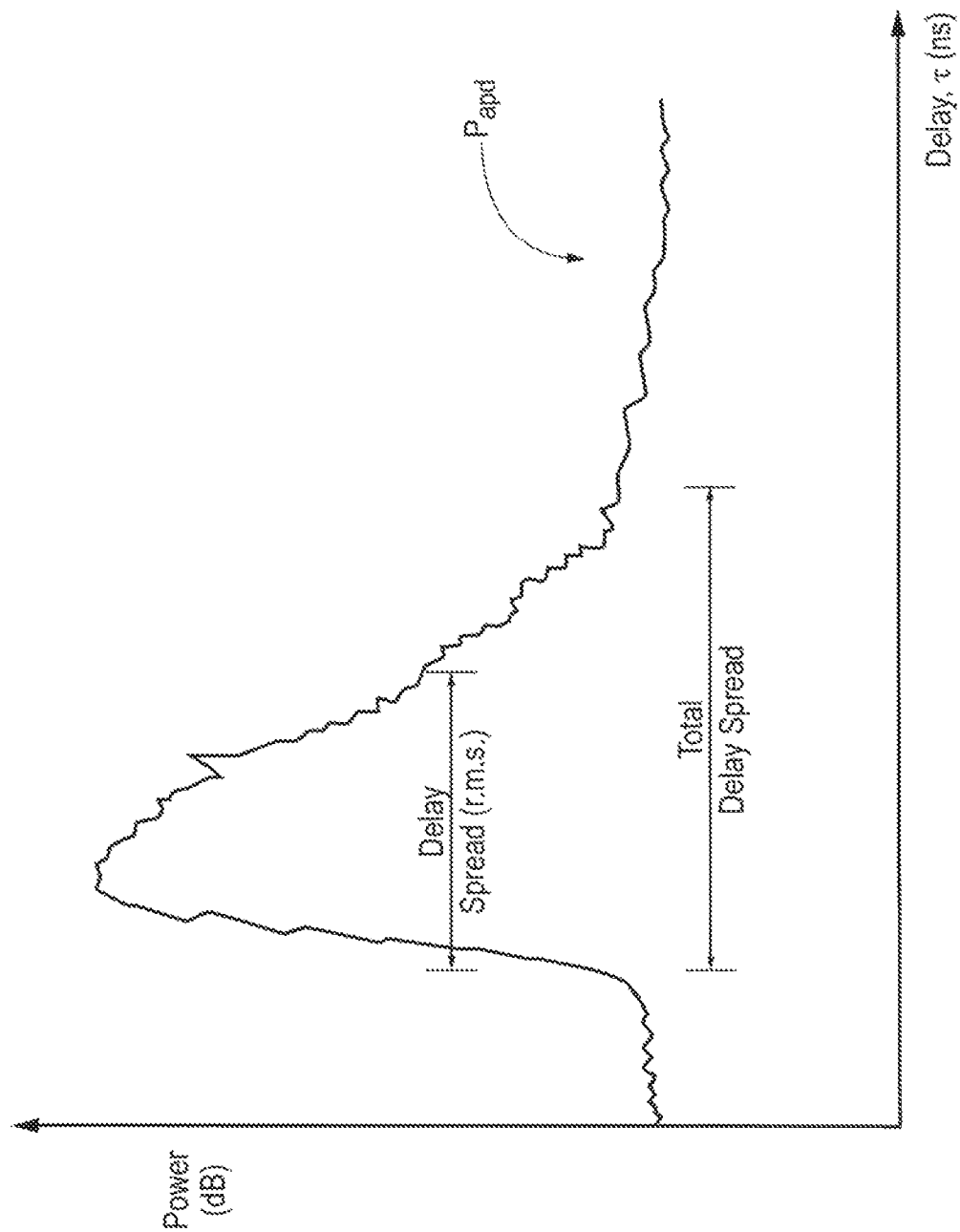
FIG. 23 illustrates a typical power delay profile averaged over a plurality of multipath signals.

When one considers a plurality of power delay profiles, the averaged power delay profile might look like FIG. 23. The terms defined above are essentially the same in the treatment of averaged data.

RMS delay spread can thus show the statistical distribution of delays which is caused by multipath. A large delay spread correlates to frequency selective fading in wide-band systems (see FIG. 21A). A relatively small delay spread by contrast corresponds to a "flat fading" profile, where fading is relatively independent of frequency across the system frequency bandwidth.

To derive an expression for delay spread, it is helpful, first, to define an expression for the weighted average multipath delay:

$$D = \frac{1}{P} \int_{t0}^{tx} (\tau - \tau_0) P_{apd} dp d\tau$$

in which P is power; tx is the delay of a given multipath x; $\tau$ is the delay; and $P_{apd}$ is an expression for the average power delay profile (See FIG. 23). As for the discrete case, illustrated in FIG. 22, the RMS delay spread, $D_{spread}$, may be defined using the weighted average multipath delay.

Figure 21A:
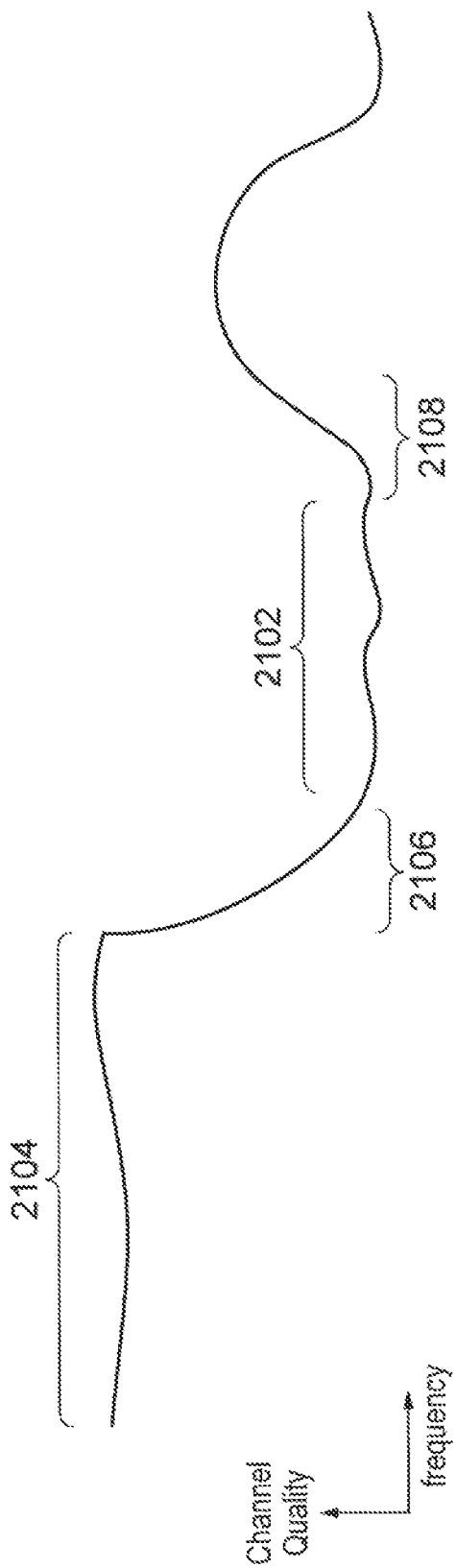
FIG. 21A illustrates frequency selective fading (of channel quality)

The frequency selective fading in channel quality illustrated in FIG. 21A includes ranges of frequencies over which the fading in channel quality remains flat (2102, 2104) and other ranges at which fading is more pronounced (2106, 2108). Notably, a flat fading profile is not necessarily correspond to a high channel quality measure, as is the case for one illustrated range 2102; where channel quality is relatively low but fading is not frequency selective over that range.

In order to simplify evaluation of the fading characteristic (for direct comparison to system bandwidth, for example), "coherence bandwidth" may be calculated from delay spread. The coherence bandwidth, Wc, for a given system is defined in the following formula:

$$Wc = \frac{1}{2\Pi D_{spread}}$$

where, $D_{spread}$ means the delay spread.

For a system having a known system bandwidth (e.g. 20 MHz), the coherence bandwidth is used to determine whether the delay causes flat fading or frequency selective fading. If coherence bandwidth is wider than system bandwidth, it is flat fading. If coherence bandwidth is narrower than system bandwidth, it is frequency selective fading.

In the case of LTE, the delay spread is determined by consulting a table reproduced here as Table 1, quoted from R4-070572 submission to 3GPP. Table 1 Summary of delay profiles for LTE channel models.

| | Channel model | Delay spread (r.m.s.) |
|---|---|---|
| Low delay spread | Extended Pedestrian A (EPA) | 43 ns |
| Medium delay spread | Extended Vehicular A model (EVA) | 357 ns |
| High delay spread | Extended Typical Urban model (ETU) | 991 ns |

In urban macro area with Macro-cell, the larger delay spread might be considered most likely to occur. For example, Winner project defined the delay profile for wide area between IOns and 4600 ns—further details of the Winner project may be found at http://projects.celtic-initiative.org/winner+.

CQI Report

In order to provide accurate link adaptation, a channel quality indicator (CQI) was introduced in release 8 of LTE. UE measures the channel quality of the downlink and reports it to an eNodeB (in an uplink transmission, e.g. PUSCH or PUCCH). CQI is used to report a measure of the channel quality of the downlink. Based on the report, the eNodeB performs link adaptation by means of a scheduler.

Two categories of CQI are defined, one is periodic CQI and the other is aperiodic CQI. UE transmit periodic CQI for every certain subframe. The certain subframe can be changeable by higher layer if necessary. UE also transmit aperiodic CQI if necessary.

Furthermore two bandwidth types of CQI are considered: one is wideband CQI, the other is sub-band CQI. Due to frequency selective fading, the channel quality of each subcarrier might be different. In the case of wideband CQI, one value, averaged over the whole bandwidth, is transmitted. Wideband CQI reports do not assist in adapting to frequency selective situations. In the case of sub-band CQI, the whole band is split into sub-band parts and the channel quality of each sub-band part is measured.

Comparing coherence bandwidth with system bandwidth in wideband systems, like LTE, it is clear that the wider system bandwidth leads to a higher predisposition to suffer frequency selective fading. The sub-band CQI thus provides a more responsive frequency scheduling than the wideband CQI alone.

Sub-Band Size

In order to avoid requiring an excessive number of sub-band CQI transmissions, the sub-band size is selected to be a limited number of resource blocks. Depending on system bandwidth (whole bandwidth), the sub-band size is defined in the specification (see Table 2), where parameter Sub-band Size k is the number of RBs (Resource blocks).

TABLE 2

Sub-band Size (k) vs. System Bandwidth
(From 3GPP TS 36.213 V8.8.0)

| System Bandwidth $N_{RB}^{DL}$ | Sub-band Size (k) |
|---|---|
| 6-7 | NA |
| 8-10 | 4 |
| 11-26 | 4 |
| 27-63 | 6 |
| 64-110 | 8 |

In its present specification, therefore, the LTE standard provides no definition of sub-band CQI in LTE systems having system bandwidth of narrow band (e.g. less than or equal to 6RBs). Only wideband CQI is applied for this case. It is noted that, in this specification, all but the sub-band at the highest frequency will be of the same, defined sub-band size.

"Best M" Sub-Band CQI Transmission

Even if the sub-band size is defined more to be than one RB (Resource Block), the number of CQI which UE have to transmit at one time is typically considered too large. For example, when the system bandwidth is 110 RBs (20 MHz), the number of sub-bands is 110/8≅13. In order to reduce the signalling load and uplink interference, a CQI reporting method is introduced in REL-8 LTE which selects a restricted number, M, of CQI from amongst the plurality of CQIs measured by the UE. The scheduler operates to allocate the frequency resource of good condition for UE, so it is more important for the scheduler to know which sub-band is in "best condition" rather than which one is worst condition.

Therefore, UE makes the ranking based on sub-band channel quality and select the best "one to Mth" sub-band CQIs and transmits the selected sub-band CQIs.

Figure 2:
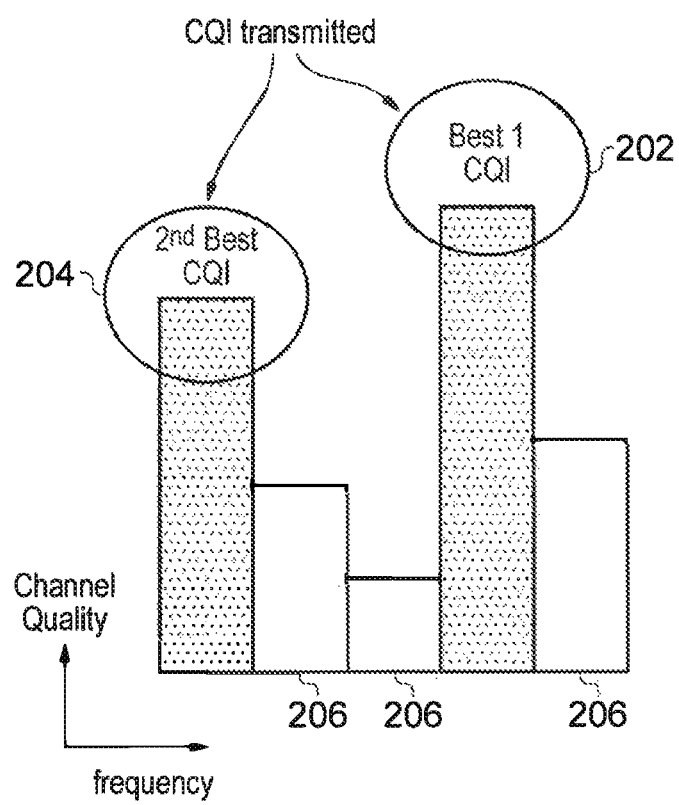
FIG. 2 shows the conventional selection of the "Best M" sub-band CQIs.

In the example illustrated in FIG. 2, the UE is configured to report only the "best two" CQIs: the UE transmits the "best" sub-band CQI value 202 and "second best" sub-band CQI value 204 on top of wideband CQI value. The CQI is omitted for other sub-bands 206 from third best-to Mth best. This method reduces unnecessary signalling.

CQI Difference Transmission Method

If the absolute value of CQI is transmitted for each sub-band, the number of signalling bits to be transmitted may be large because the signalling load is the number of sub-band multiplied by the value of CQI granularity (i.e. the number of quantization bits).

In order to reduce the signalling overhead, a difference transmission method is introduced in REL-8 LTE. In other words, the sub-band CQI is transmitted as a difference value between the measured sub-band CQI and the prevailing wideband CQI; thereby reducing the number of bits to be transmitted.

*Sub*-band *CQI*=wideband *CQI*(whole band)+difference aldue(*sub*-band)

Sub-Band CQI for Narrowband

As has been noted above, particularly with reference to Table 2, sub-band size is not defined in all conventional LTE systems: the LTE standard provides no definition of sub-band CQI in LTE systems having system bandwidth less than or equal to 6RBs (referred to hereafter as "narrowband" systems). In these narrowband systems, only wideband CQI are applied. This has not been considered to be a particular issue before, because most network operators have allocated more than 6RBs (e.g. 5 MHz or wider) of bandwidth to LTE; the 6RB case, while provided for in the standard, is not common.

However, there are scenarios, for instance an urban area with a large cell (and therefore a presumed delay spread of 3000 ns-4000 ns), where finer frequency resolution may be attractive in spite of the narrower system bandwidth.

In particular, the terminal may use narrow band (i.e. "virtual carrier") rather than wideband to support effective MTC device operation. The standard specification does not necessarily cater for this situation very well.

Previous co-pending patent applications have discussed in detail the design and operation of some parts of a so-called virtual carrier (VC) subsystem, embedded in a conventional host carrier (HC), suitable for use particularly in LTE networks serving machine-type communication (MTC) devices among their mix of user equipment terminals (UEs). Certain aspects of virtual carrier systems are discussed in Annex 1 below.

To adapt conventional CQI reporting to the circumstances where narrowband systems, and MTC-supporting virtual carrier systems in particular, need sub-band CQI, three related methods for defining and if necessary adapting a sub-band size are described: fixed, semi-static and adaptive sub-band size. To varying degrees, they are each specified in accordance with the channel condition.

The selection of a new sub-band size may not be straightforward as, depending on the situation of the UE (Urban area, macro-cell etc.) the delay profile may be different. This situation may however be used for pre-configuration of sub-band size.

One of the key benefits of OFDM based radio technologies (such as LTE) is frequency scheduling. However, wideband CQI cannot deliver this benefit alone. Sub-band CQI reporting supplements the wideband CQI to give finer measurement of the radio conditions in any given sub-band so that this can be taken into account by the scheduler.

The MTC devices using a narrowband carrier can experience selective fading in case of large delay profiles (e.g. urban area).

Preferably, new sub-band size which is optimized for MTC operation should be defined for virtual carrier.

The various embodiments introduce a sub-band size for a VC subsystem (where none was provided previously) and at least one embodiment introduces an "adaptive sub-band size".

Specific embodiments are described in the following order:

A first embodiment in which a fixed sub-band size is defined for a narrow band of 6RB or less. A further finer sub-band size is considered on the basis of individual subcarriers within resource blocks.

A second embodiment in which a semi-static sub-band size is defined. By semi-static is meant that the sub-band size, once defined—upon installation of MTC device, for instance, is seldom if ever changed but permits changes should this be desired A third embodiment in which the concept of adaptive sub-band size, i.e. the definition of sub-band size in accordance with substantially current channel condition in the narrow system frequency band of a virtual carrier.

Thereafter the details of suitable CQI transmission methods are described.

Additional techniques for physical and higher layer signalling of VC sub-band configuration are also then set out.

Fixed Sub-Band Size for Virtual Carrier
(Embodiment 1)

In this embodiment, a new sub-band size is introduced in case of narrow band (e.g. 6RBs bandwidth).

A convenient and suitable size of frequency range for this narrow band sub-band is a RB (1 resource block=12*15 kHz=180 kHz), which is the baseline of resource allocation in LTE. As a result, for a virtual carrier bandwidth of 6RBs, this would give six sub-bands.

In one version of the fixed sub-band size case, this sub-band size may be defined in a table (Table 3). The benefit of fixed size and defined in specification is that there is no need for signalling.

TABLE 3 the fixed sub-band size definition (examples)

| case | sub-band size "k" | Unit of k |
|---|---|---|
| wideband | 6 | Resource blocks |
| fixed sub-band(normal) | 1 | Resource blocks |
| fixed sub-band(fine) | 1 | subcarriers |

In a typical urban environment (e.g. delay profile=1000 ns), IRB resolution might be sufficient. However, if larger delay profile (2000-5000 ns, i.e. complicated multipath case), a finer resolution might be better. As Table 3 indicates, if the finer resolution is needed, a sub-band size of one subcarrier can be used (there are 12×6=72 subcarriers for 6RBs).

Table 3 shows examples of suitable fixed sub-band size. There are of course other alternatives, for instance an intermediate case (e.g. 2RBs) is also possible.

The Procedure of Sub-Band CQI Transmission in MTC

An exemplary procedure for sub-band CQI transmission, suitable for implementation in an MTC terminal using a narrowband (VC) subsystem, includes: measurement of channel characteristics within each VC sub-band (for example, signal strength, interference, etc.); calculation of signal to interference plus noise ratio (SINR); averaging the SINR results for each VC sub-band of a fixed sub-band size; optionally, selecting the "best M" VC sub-band CQI values; performing coding and modulation; allocating physical resources for the selected sub-band CQI values and wideband CQI value; waiting for the next subframe to transmit selected sub-band CQI (periodic case) and/or transmitting selected sub-band CQI to eNodeB (both periodic and aperiodic reporting cases); and waiting for the scheduling information.

A suitable exemplary counterpart procedure to the above procedure for sub-band CQI transmission in base station includes: waiting for the subframe for CQI (periodic case only); receiving the sub-band and wideband CQI; performing demodulation and channel decoding; reading CQI value and input to scheduler; and scheduling transmissions. Scheduling transmissions includes: selecting a Modulation and Coding Scheme (MCS) based on CQI values; indicating downlink (DL) resource allocation on PDCCH; transmission of data on PDSCH; receiving ACK/NACK from UE; and retransmitting data, if necessary (e.g. if NACK received or time out without ACK or NACK).

Semi-Static Sub-Band Size for Virtual Carrier
(Embodiment 2)

In another embodiment, a semi-static configuration may be applied to the determination of a suitable sub-band size.

Semi-static means once the sub-band size is decided, it continues to be used until the situation is changed. For example, in case of smart meter, the value is configured at the meter install, there being no need to change the size after that under typical conditions. In general, if the MTC terminal is fixed or unlikely to move (e.g. smart meter), the sub-band size will not need to be changed often. The semi-static configuration method is also suitable for cases where a UE (not necessarily an MTC device) is stationary.

Compared to embodiment 1, the semi-static configuration of sub-band size needs to be aligned at least once between UE and eNodeB.

One simple way of defining sub-bands in these circumstances is to provide a parameter which has direct value of sub-band size. This is simple and adaptable to any case.

If there are a limited number of options for sub-band size, it may alternatively be effective to define sub-band size with reference to a table. Table 4 shows an exemplary configuration of sub-band size for semi static case. Depending on configuration number, sub-band size k is defined. In this case, the number of signalling for indication of sub-band size might be reduced compared to direct value.

TABLE 4

| higher layer configuration # | sub-band size k (the number of RBs) | Corresponding number of sub-band in VC (bandwidth 6RBs) |
|---|---|---|
| 1 | 1 | 6 |
| 2 | 2 | 4 |
| 3 | 3 | 2 |
| 4 | 6 | 1 (i.e. same as wideband) |

The Procedure of Semi-Static Sub-Band Size Configuration

Two cases of semi-static configuration are considered: one is UE initiated (UE decides appropriate sub-band size or stores pre-configuration and indicates this to the eNodeB); the other, is eNodeB initiated (eNodeB decides an appropriate sub-band size or stores a pre-configuration for a certain UE and indicates this to the UE).

In UE initiated case, based on manual input, terminal may send the signalling of sub-band configuration with higher layer to eNodeB. Alternatively it is configured for UE in advance (as an initial setting).

The sub-band size can be configured based on parameters selected individually or in combination from the following categories of radio propagation conditions:

- a site type or characteristic cell radius which covers the MTC UE: examples of site types include: macro-cell, micro-cell, pico-cell, femto-cell (such as provided by an indoor, consumer-installed base station unit). As noted above, a macro-cell may experience greater delay spread and a smaller sub-band size would be warranted.
- Morphology of area (considerations here include: whether the area is hilly or mountainous; whether it is close to an expanse of water; or the nature of the built environment)—examples of types of morphologies include: dense urban, urban, sub-urban, and/or rural
- Mobility type of UE (Fixed, slow, middle, high). High mobility, a UE in a car travelling at 100 km per hour, for instance, might mean that local conditions giving rise to selective frequency fading would be transitory and wideband CQI might be adequate, whereas a smaller sub-band size may be useful for a static or slow moving UE under such conditions.

UE Type (mobile handset, smart meter, hub/gateway device, home appliance etc.)

Location of UE (e.g. map reference, GPS Area name, City name etc,): a database of geographic locations (indexed by grid reference, GPS coordinates or other suitable scheme) may be provided which associates a location to an expected delay profile (so that "Boulder, Colo." would be associated with a higher expected delay profile than "Amagansett, Long Island, N.Y.").

Direct value (e.g. delay profile, delay spread, system bandwidth, transmission mode etc.)

Figure 3:
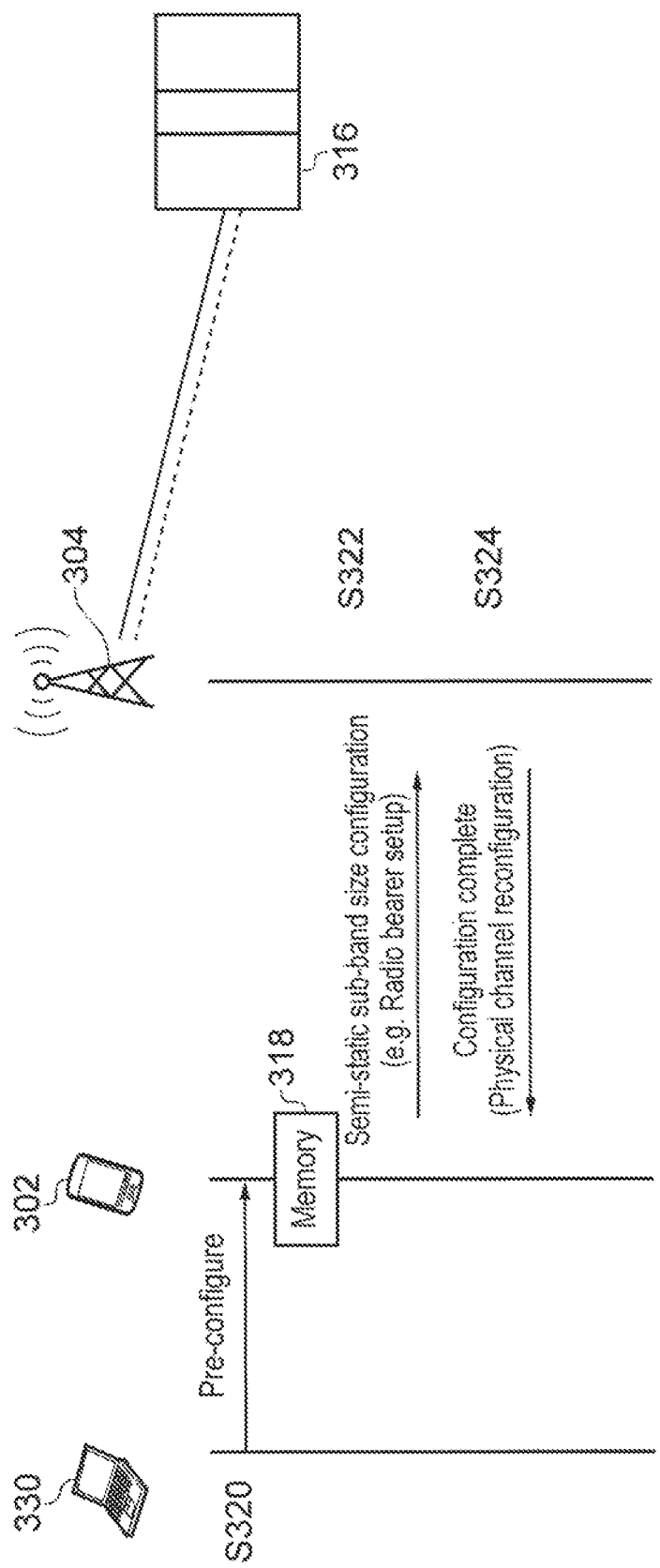
FIG. 3 illustrates an exemplary UE initiated semi-static sub-band size configuration procedure in accordance with a second embodiment of the invention.

FIG. 3 illustrates an exemplary UE initiated semi-static sub-band size configuration procedure. Firstly, an external maintenance terminal 330 pre-configures a UE 302 to facilitate setting (and local storage 318) of a semi-static sub-band size value (or table of values)—step S320. The UE 302 is initialised and sends the semi-static sub-band configuration to an eNodeB 304 (so that the eNodeB can interpret CQI reports from that UE)—step S322. The sub-band configuration sent by the UE 302 may include for example radio bearer setup data. In one implementation, the UE 302 is an MTC device and the sub-band configuration is sent under control of an MTC server 316. Completion of configuration is confirmed by receipt of a completion message from the eNodeB 304—step S324.

In the eNodeB initiated case, based on location information (e.g. GPS location, geographic coordinates), the eNodeB can estimate radio environment (Urban, rural, etc.) and the delay profile for each UE. Based on this, the eNodeB decides upon the sub-band size and indicates the selected sub-band size to UE.

Figure 4A:
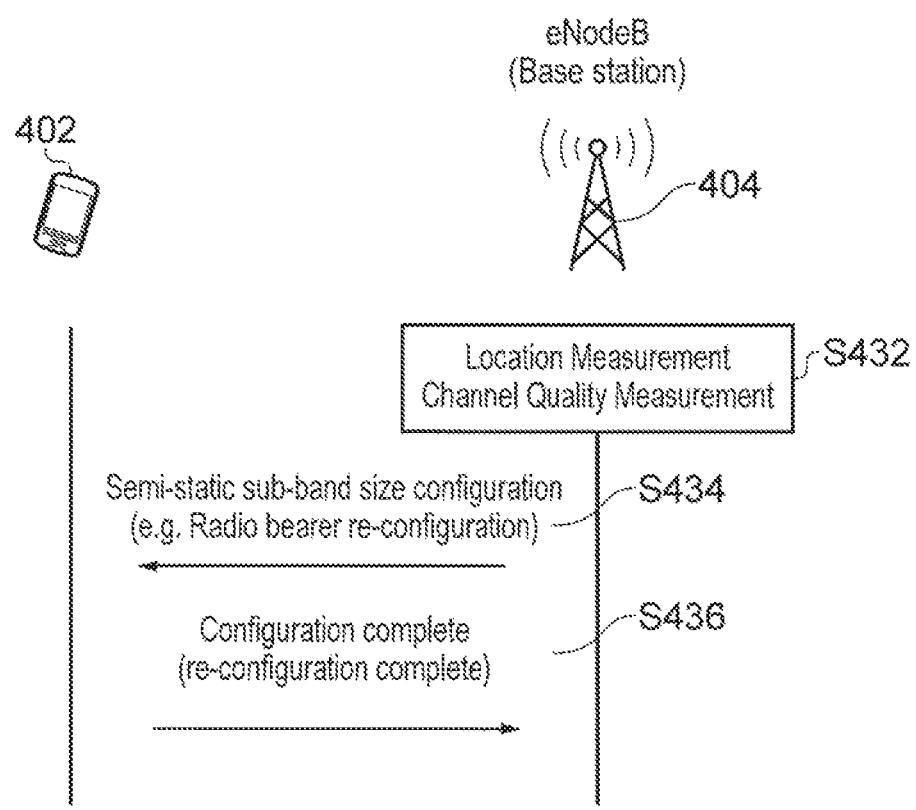
FIG. 4A to 4C illustrate exemplary eNodeB initiated semi-static sub-band size configuration procedures in accordance with the second embodiment of the invention.

FIG. 4A illustrates an exemplary eNodeB initiated semi-static sub-band size configuration procedure. Here a eNodeB 404 obtains information of cell situation (location information etc.) S432, sends the semi-static sub-band configuration to a UE 402 (as part of radio bearer re-configuration signalling, for example) S434 and once the UE 402 completes initialisation, receives a completion message from UE 402, S436.

Figure 4B:
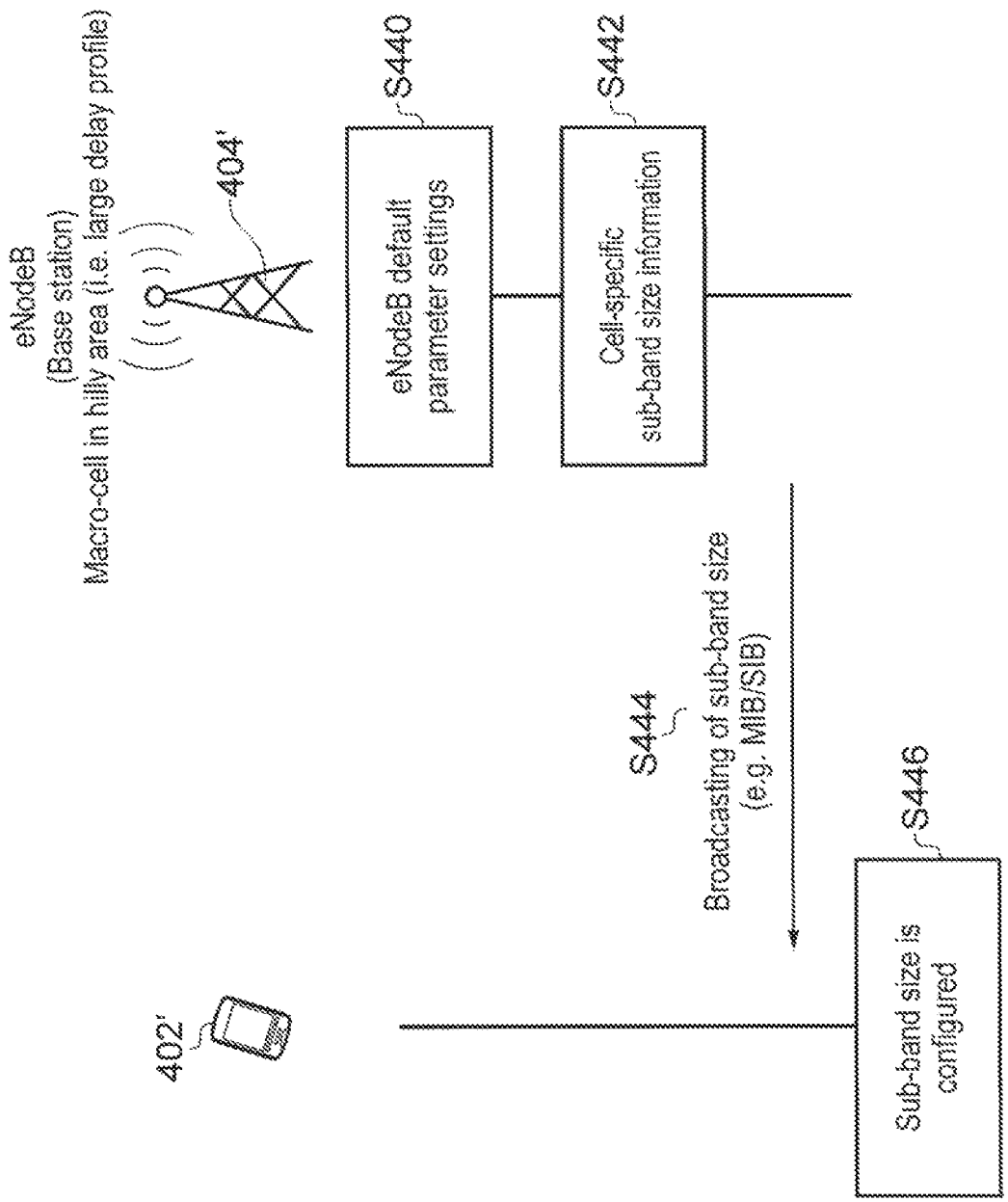

FIG. 4B illustrates another exemplary eNodeB initiated semi-static sub-band size configuration procedure. In addition to retrieving default eNodeB parameter settings S440, the eNodeB 404' obtains information of cell situation (location information etc.) S442 and sends the semi-static sub-band broadcast information to a UE 402' (as part of MIB/SIB, for example) S444. Once the UE 402' receives this information, the UE 402' configures itself S446. In this example, the UE 402' sends no completion message. Thus sub-band size may be configured according to default eNodeB parameter settings.

Figure 4C:
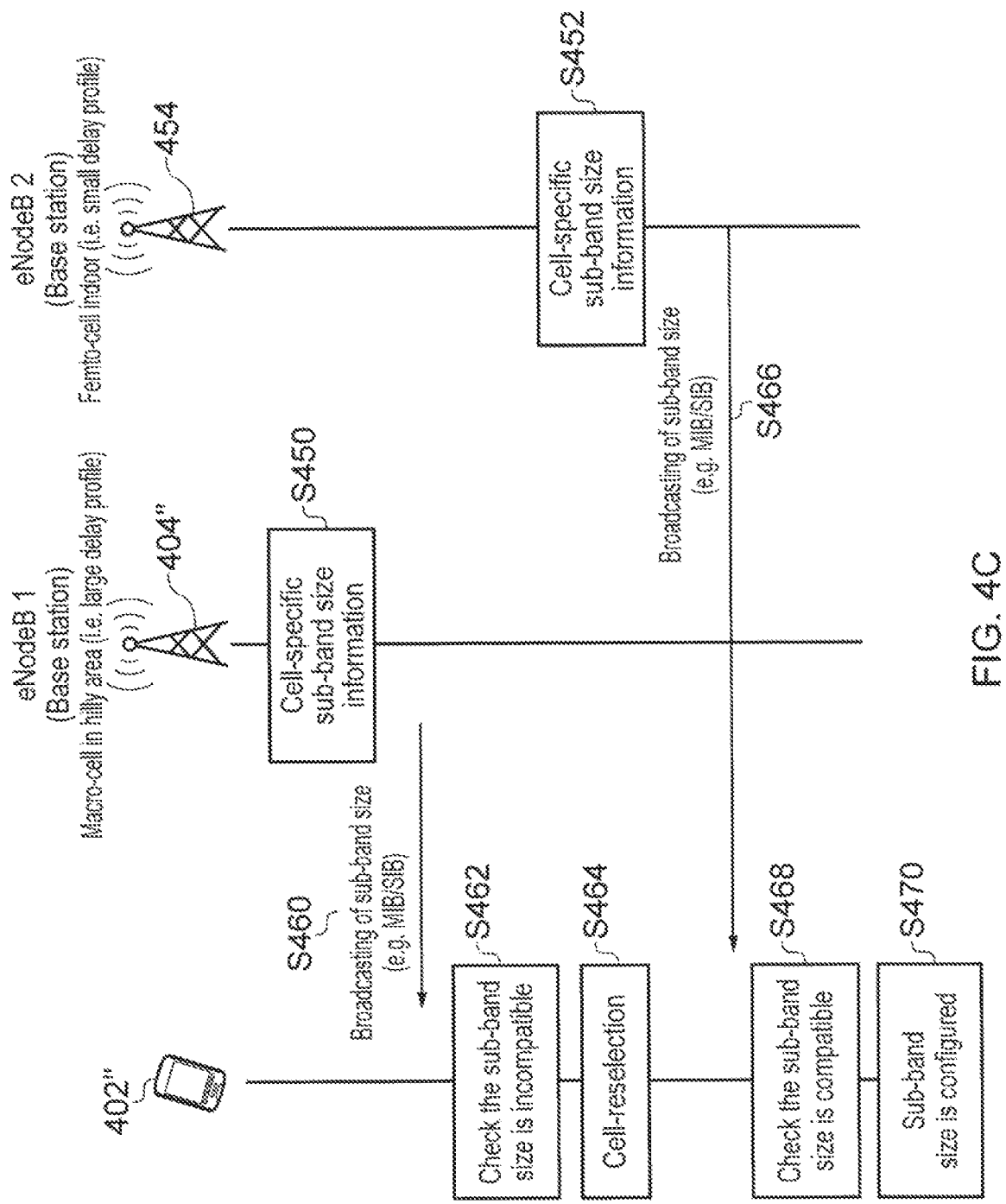

It is contemplated that MTC devices may be provided with limited flexibility in terms of sub-band sizes that can be adopted. FIG. 4C illustrates another exemplary eNodeB initiated semi-static sub-band size configuration procedure suitable where UEs might have a restriction of capability (i.e. the selection of sub-band size is not flexible due to lack of UE capability). Here a first eNodeB 404" obtains information of cell situation (location information etc.) S450, sends the semi-static sub-band size information to a UE 402" (as part of MIB/SIB, for example) S460 and once the UE 402" receives this information, the UE 402" checks whether it is acceptable or not (i.e. the UE can report using the sub-band size indicated in the broadcast information) S462.

If the sub-band size is determined not to be compatible, the UE 402" seeks attachment to another cell (i.e. reselection) and the procedure starts again S464. Thus a second eNodeB 454 obtains information of cell situation (location information etc.) S452, sends a second semi-static sub-band broadcast information to the UE 402" (as part of MIB/SIB, for example) S466 and once the UE 402" receives this information, the UE 402" checks whether it is acceptable or not (i.e. the UE can report using the sub-band size indicated in the broadcast information) S468. In this second case, the UE 402" finds an eNodeB 454 offering a compatible sub-band size. The UE 402" decides to use this cell and configures the sub-band size accordingly S470.

Adaptive Sub-Band Size for Virtual Carrier (Embodiment 3)

In the third embodiment, the preferable sub-band size depends on characteristics of propagation environment, typically time-varying.

Three sub-band size selection methods are considered: the "delay spread" method; the "subcarrier SINR" method; and a method based on PDSCH Tx mode. Each adapts the recommended sub-band size to suit the time-varying ambient radio propagation environment.

Based on Time Domain Measurement (the Delay Spread)

The "delay spread" method directly estimates the coherence bandwidth from delay spread by measurement.

As noted above, delay spread is the root-mean-square value of the weighted average multipath delay. In providing a channel estimation function, the UE receiver finds the multipath and averages the strength and time dispersion. Based on this value, the coherence bandwidth is calculated and a suitable sub-band size is selected depending upon the inferred fading conditions (i.e. whether there is flat or frequency selective fading).

The UE performs the channel estimation and synchronization based on reference signals from eNodeB, the frequency response of each channel is obtained by channel estimation and then converted from frequency domain to time domain.

In time domain signal, each multi-path of timing and power is obtained. By averaging them, the delay spread can be calculated.

The steps of sub-band size selection from delay profile include:

Channel estimation: in which channel coefficients are obtained (frequency response)

Inverse fast Fourier transform (IFFT), in which the channel coefficients are converted from frequency domain to time domain Calculate; weighted average of multipath delay $$D = \frac{1}{P}\int_{t0}^{tx}(\tau - \tau_0)P_{apd}dpd\tau$$

Calculate delay spread
where

| | |
|---|---|
| P | total power |
| tx | delay of multipath x |
| τ | delay |
| $P_{apd}$ | average power delay profile |

Calculate delay spread $D_{spread}$=standard deviation(averaged delay)

Calculate coherence bandwidth $$W_C = \frac{1}{2\pi D_{spread}}$$

IF (coherence bandwidth<the current sub-band size) THEN select smaller sub-band size
IF (coherence bandwidth>the current sub-band size) THEN select larger sub-band size
ELSE IF (coherence bandwidth≈the current sub-band size) THEN keep the current sub-band size.
Indicate the preferable sub-band size to eNodeB. Techniques for signalling adaptive sub-band size changes are discussed below.

Based on Frequency Domain Measurement (Subcarrier SINR)

The second sub-band size selection method uses frequency domain measurements for each subcarrier. This method is based on signal to interference plus noise ratio (SINR) measurement and evaluate the fluctuate of SINR for each subcarrier (or each RBs), in essence this method determines the sub-band size by determining:

IF (the difference of average SINR between sub-bands [510, 512]>threshold X), THEN different sub-band is allocated.

The sub-band size change, based on subcarrier SINR, is illustrated in FIG. 5. For each successive sub-band (sub-band 3, 503, say) the average SINR is compared to the previous value for average SINR (sub-band 2, 502, in this example) and if the difference, 512, exceeds the threshold difference, X, triggers a sub-band size selection procedure.

The steps of sub-band size selection from subcarrier SINR include:
 Measurement of SINR for frequency domain (i.e. each subcarrier/RBs)
 Assume the tentative sub-band size X=2
 Sub-band size search (described below)
  Indicate the preferable sub-band size to eNodeB. Again, techniques for signalling adaptive sub-band size changes are discussed below.
Sub-Band Size Search Procedure The large sub-band size should preferably be selected for little fluctuation of channel quality, whereas narrow sub-band size should be selected for large fluctuation of channel quality.

Figure 6:
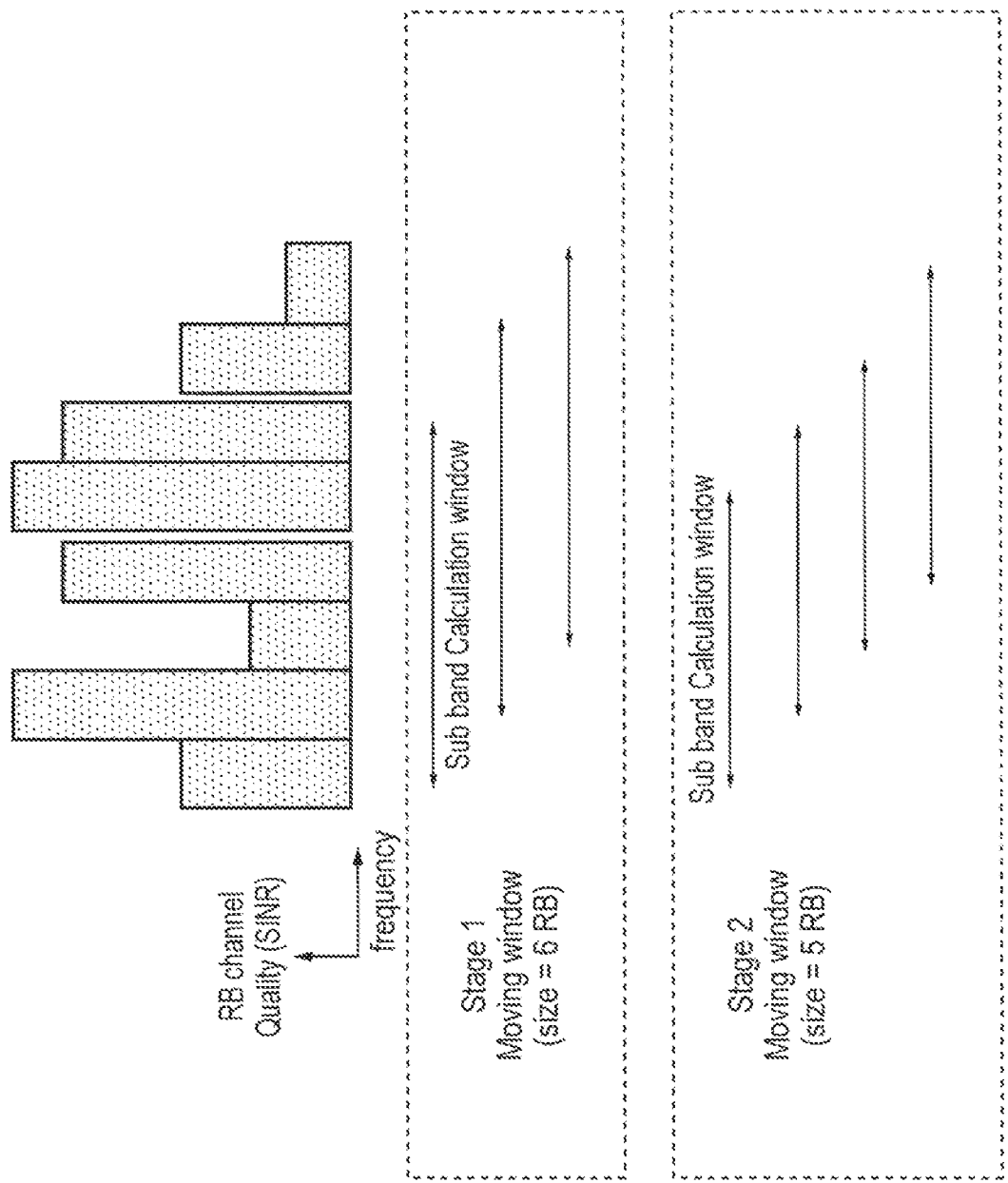
FIG. 6 illustrates how sub-band size calculation window is changed during sub-band size search in the subcarrier SINR method.

The sub-band search procedure introduces a "calculation window" for sub-band size selection, as illustrated in FIG. 6. The standard deviation of the channel quality is calculated for the SINR measurements in the window. The standard deviation of channel quality shows the degree of CQI fluctuation in the window.

If the standard deviation is below a pre-defined threshold, $\sigma_{th}$, the channel quality in the window could be flat and the sub-band size is left unchanged.

If the standard deviation is above the defined threshold, this would indicate that the channel quality in the window was not flat. An incrementally narrower sub-band size is tried in the next stage (shown as the shorter "windows" in "stage 2" of FIG. 6).

The steps of sub-band size search include:
1. Define the initial calculation window size (sub-band size)
2. Calculation start
3. Set the calculation window between the start position and end position (start position+sub-band size)
 Calculate the standard deviation of CQI
 Store the standard deviation
 Shift window start position one RB higher (in frequency)
 Repeat until the end position reached (i.e. the band edge)
4. Search for the value below the threshold (e.g. threshold is 1.414 if tolerance is ±2) among the stored standard deviation values.
5. Select the sub-band size and the range (between start position and end position)
6. Stage 2 start (new sub-band size for remaining part)
7. Set new calculation window size (previous size−1 RB)
 Repeat from 2 to 5
 If the sub-band size=1 RB then end; else go to 7

Figure 21B:
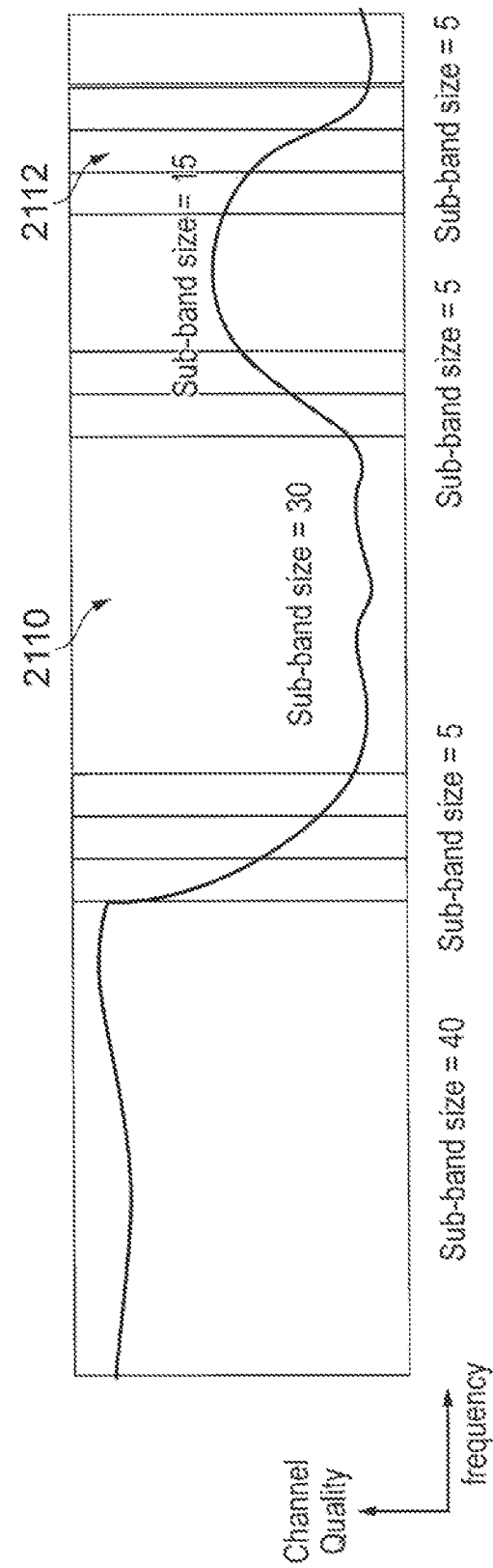
FIG. 21B illustrates the adaptive sub-band size across a range of frequencies in frequency selective fading conditions.

The resulting ranges of sub-bands have sub-band sizes tailored to the more local fading characteristics as illustrated in FIG. 21B.

Rather than exiting the procedure above [i.e. "end"], in certain embodiments the procedure moves on to a next frequency range. For system bandwidths, or ranges of bandwidth within the system bandwidth, where frequency selective fading is flat the sub-band size may stay the same or be allowed to increase; conversely where the frequency selective fading is more profound, the sub-band size in that system bandwidth or range of bandwidths is progressively reduced.

Based on PDSCH Tx Mode

The third sub-band size selection method infers the appropriate sub-band size from the PDSCH transmission (Tx) modes being used in the downlink.

There are many diversity techniques to overcome fading. Multi-antenna techniques have proven particularly effective these are represented as distinct Tx modes.

For example in case of PDSCH Tx mode 2, which is Tx diversity (SFBC), wideband CQI may be applied. On the other hand Tx mode 1, which is single port, sub-band CQI is applied.

Another example, in case of PDSCH Tx mode 9, which is Dual layer beamforming, wideband CQI is applied, because beamforming may save the fading.

Depending on PDSCH Tx mode, it is possible to select a sub-band size automatically.

This is so-called implicit signalling (because the selected size is inferred without being explicitly signalled).

CQI Transmission Method

Once a sub-band size has been determined according to any one of the embodiments of the invention described above, the resulting sub-band CQIs need to be transmitted efficiently to the eNodeB. CQI transmission may be achieved using a variety of methods including: direct transmission for each sub-band (where each of the techniques for transmitting CQIs discussed above may be adopted: transmitting each sub-band CQI directly or transmitting the sub-band CQI as difference values relative to a wideband CQI). In certain circumstances sub-band CQIs can be transmitted at different times a technique referred to as time division CQI reporting. The "M best" technique may also be adopted to transmit selected sub-band CQIs. In addition, it may not be necessary to transmit any CQI where conditions are appropriate—the conditions may suitably be defined by the eNodeB.

Direct Transmission

Figure 7:
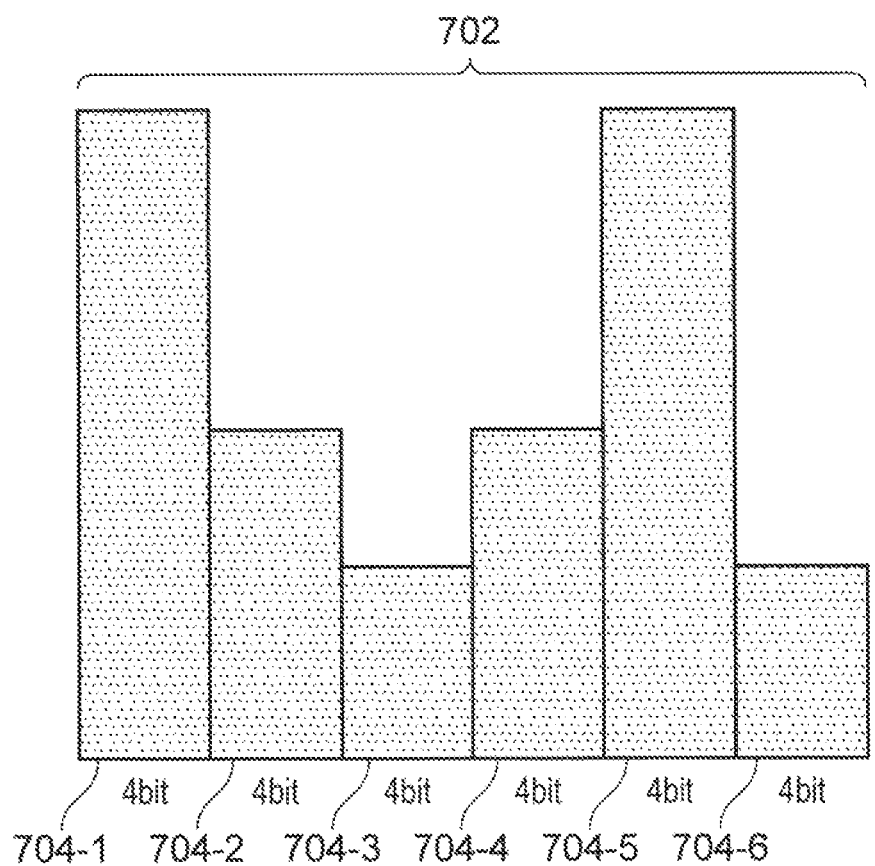
FIG. 7 shows a plurality of sub-band CQIs each being prepared for direct transmission for each sub-band.

The best way of CQI transmission is to transmit all the sub-band CQI values at the same timing, if signalling load can be allowed. This is illustrated in FIG. 7. For example, if sub-band CQI (at fine resolution) uses 4 bits and the bandwidth is set at 6RBs (giving six sub-bands, 704-1, . . . 704-6), the total signalling load 702 is 4×6=24 bits.

In REL8, only the wide-band CQI can be used at 4 bit resolution, but in narrowband (e.g. VC), the signalling load from this direct method may be acceptable.

However, if the number of sub-bands is large, the signalling load may increase beyond an acceptable level. The differential CQI method (described above) might be applied for this case. Thus for a Wideband CQI of 4 bits and six 2 bit Sub-band difference values (2×6=12 bits), the total number of bits transmitted=4+12'$^2$ 16 bits.

Depending on the number of sub-bands (or sub-band size), direct transmission and differential transmission might be interchanged.

Time Division Transmission

Figure 8:
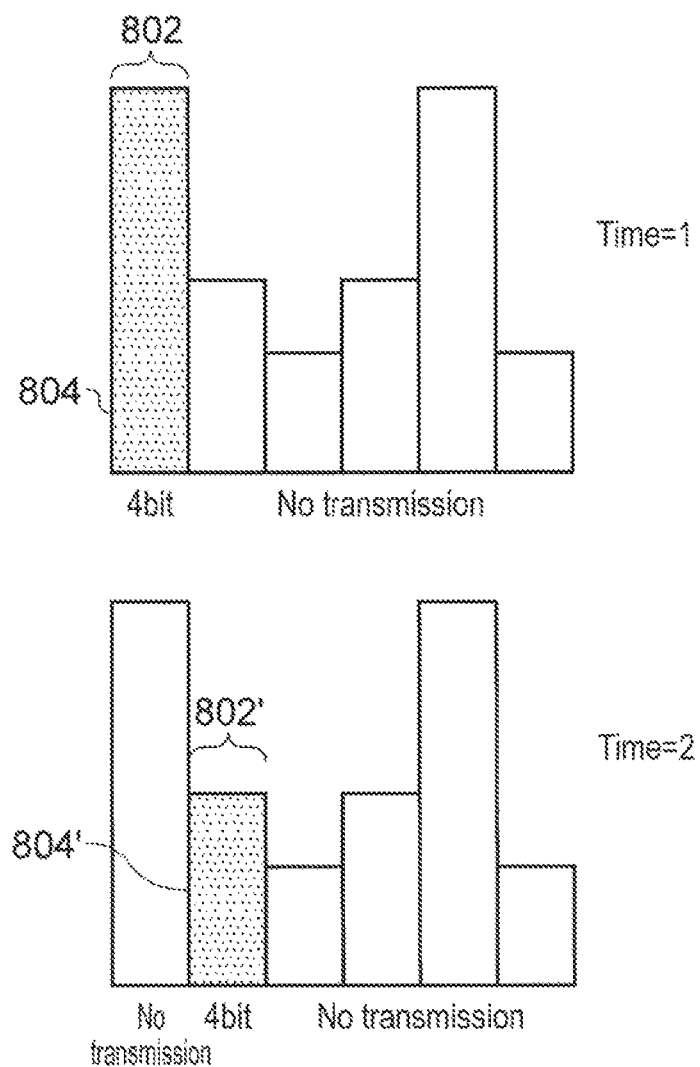
FIG. 8 shows an alternative method for transmitting the sub-band CQIs using time division.

An alternative method is to transmit respective sub-band CQI values 804, 804' in different time slots (time=1, time=2, etc.). This is illustrated in FIG. 8.

MTC terminal might be fixed (e.g. smart meter), in that case, the variation of value might be not change significantly over time. In that case, time division CQI transmission might be used without detrimental effect. As this would result in a signalling load 802, 802' of say 4 bits per sub-band CQI at one time, this serves to reduce the signalling load and avoid uplink interference.

Selected Sub-Band Transmission

Figure 9:
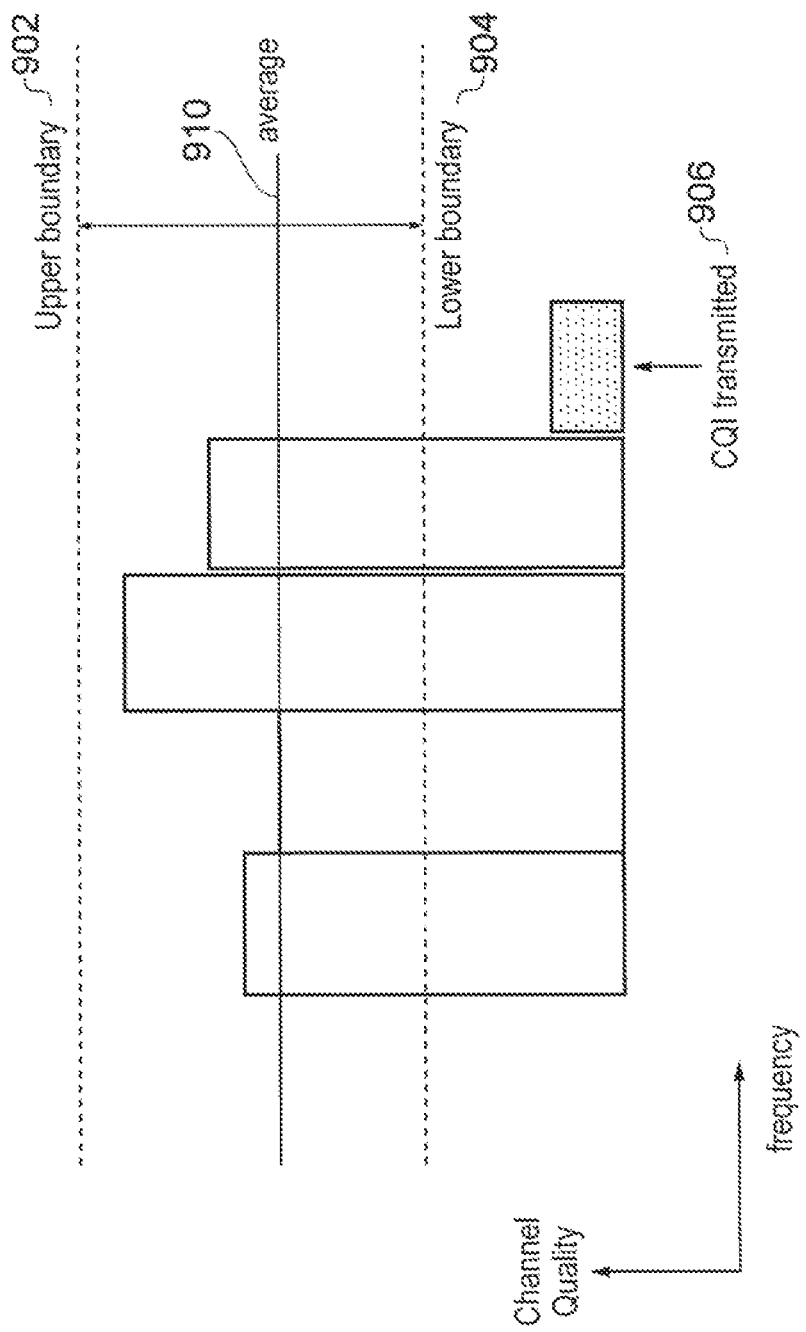
FIG. 9 illustrates a selected sub-band CQI report method (which only reports CQIs if they fall out of a predetermined range)

If the sub-band CQI is near to average value 910, there may be no need to send every sub-band CQI. In the selected sub-band transmission method, the CQI transmission is omitted provided the sub-band CQI value remains within a certain range. This is illustrated in FIG. 9. An exemplary scheme may include the following steps:

Obtain wideband CQI 910 (averaged over system bandwidth)

Define an upper boundary, 902=wideband+threshold X (or direct signalling)

Define a lower boundary, 904=wideband−threshold X (or direct signalling)

Obtain each sub-band CQI value

IF the sub-band CQI>upper boundary THEN Transmit the sub-band CQI (not shown)

IF the sub-band CQI<lower boundary THEN Transmit the sub-band CQI (906)

The Signalling of Adaptive Sub-Band Change

There are two classes of signalling for sub-band size change: L1 signalling may be used for fast changing case, while RRC may be used for slow changing case.

L1 signalling (fast)
    All sub-band
    Selected sub-band
    Variable sub-band size
RRC signalling (slow)
    UE initiated
    eNodeB initiated
    application (MTC server) initiated L1 signaling of sub-band size change If the sub-band size is changed quickly, the best way of signalling is using physical layer (layer1). This is called L1 signalling. A portion of each subframe of the radio frames is dedicated to the transmission of L1 signalling.

Figure 10:
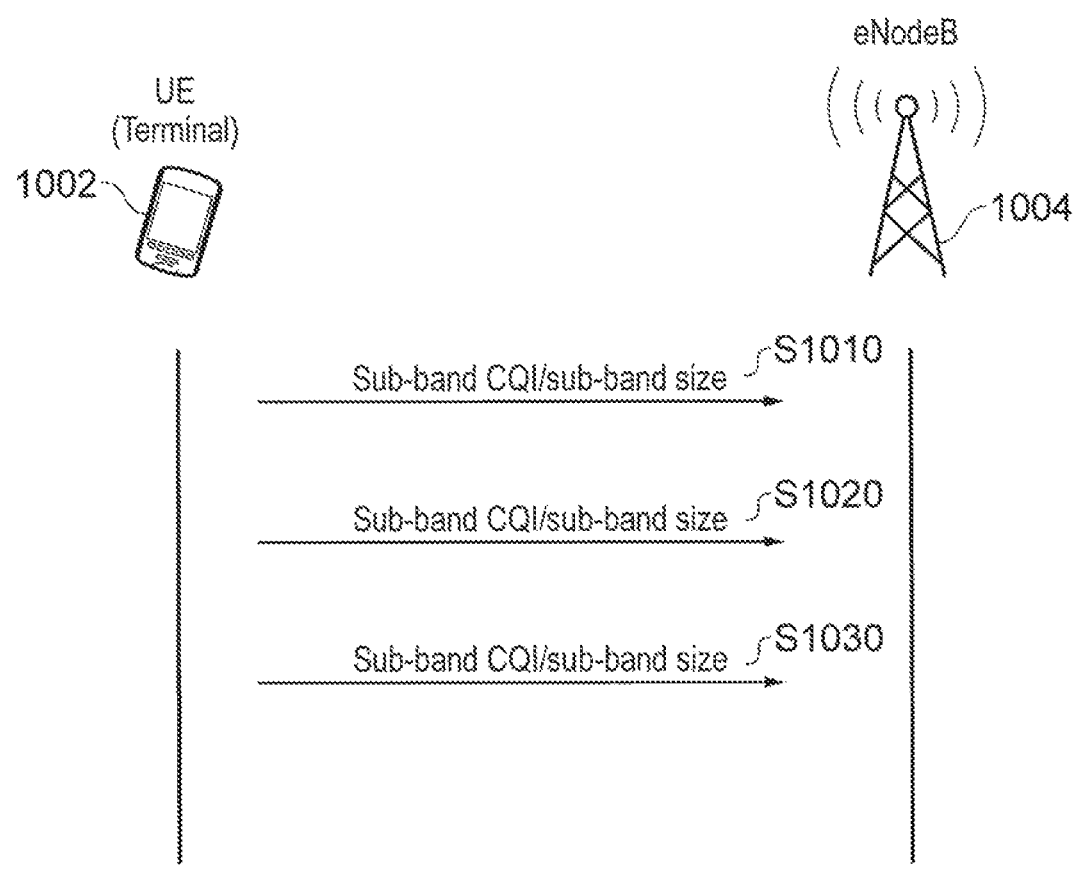
FIG. 10 illustrates L1 sub-band CQI reporting.

In FIG. 10, the L1 signalling is used to transmit sub-band size changes periodically and/or aperiodically from UE 1002 to eNodeB 1004 (S1020, S1020, S1030). The L1 signalling may be related variously to the change of sub-band size for all sub-bands; for a selection of sub-bands or even to allow for the sub-band size to vary for different groups of sub-bands.

Figure 11A:
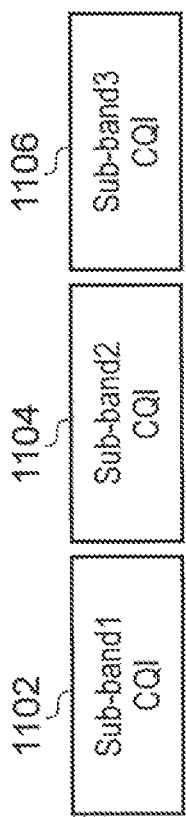
FIGS. 11A to 11C illustrate different types of signalling in the physical layer (L1) for sub-band size signalling.

In the all sub-bands case, illustrated in FIG. 11A, sub-band size changes relate to all sub-bands equally. It is noted that, if sub-band size is fixed or semi-static and sub-band CQIs are reported for all sub-band parts, the only information that needs to be transmitted is the sub-band CQI 1102, 1104, 1106. For fixed or semi-static sub-band sizes, the signalling of sub-band sizes need not be included at all.

Figure 11B:
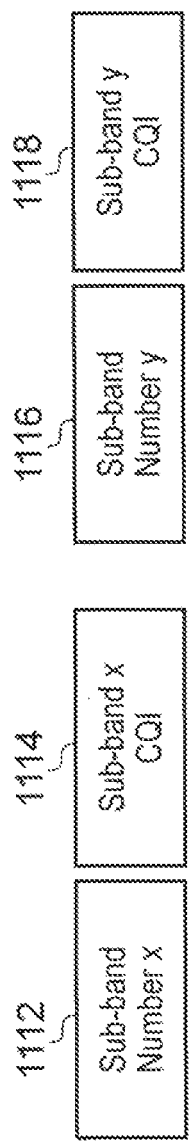

In the selected sub-bands case, illustrated in FIG. 11B, sub-band size changes are transmitted for selected sub-bands. If sub-band size is fixed or semi-static and only selected sub-bands are transmitted, both selected sub-band number 1112, 1116 and the value of CQI at selected sub-band 1114, 1118 should be transmitted.

Figure 11C:
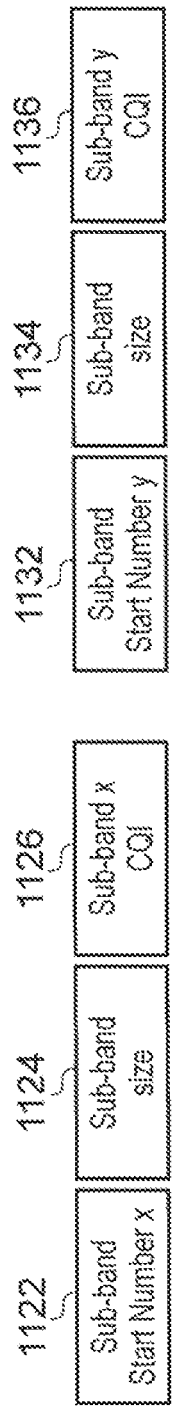

In the variable sub-band size case, illustrated in FIG. 11C, CQI transmission needs to convey each of the sub-band sizes for each of the respective sub-band CQIs reported. If sub-band size is dynamically changed, and selected sub-band CQIs are transmitted, the selected sub-band number 1122,1132, the corresponding size for the selected sub-band 1124, 1134 and the value of CQI at selected sub-band 1126, 1136 should each be transmitted. Clearly this last technique will require a considerably larger signalling payload than the preceding techniques.

FIG. 21B shows variable sub-band size across different ranges of bandwidths within a system bandwidth. Thus if sub-band CQI values are to be signalled for sub-bands 2110 and 2112, the position of the respective sub-bands and their corresponding sizes will be reported along with the CQI value itself.

RRC Signaling of Sub-Band Size Change

UE Initiated RRC Signalling

Figure 12:
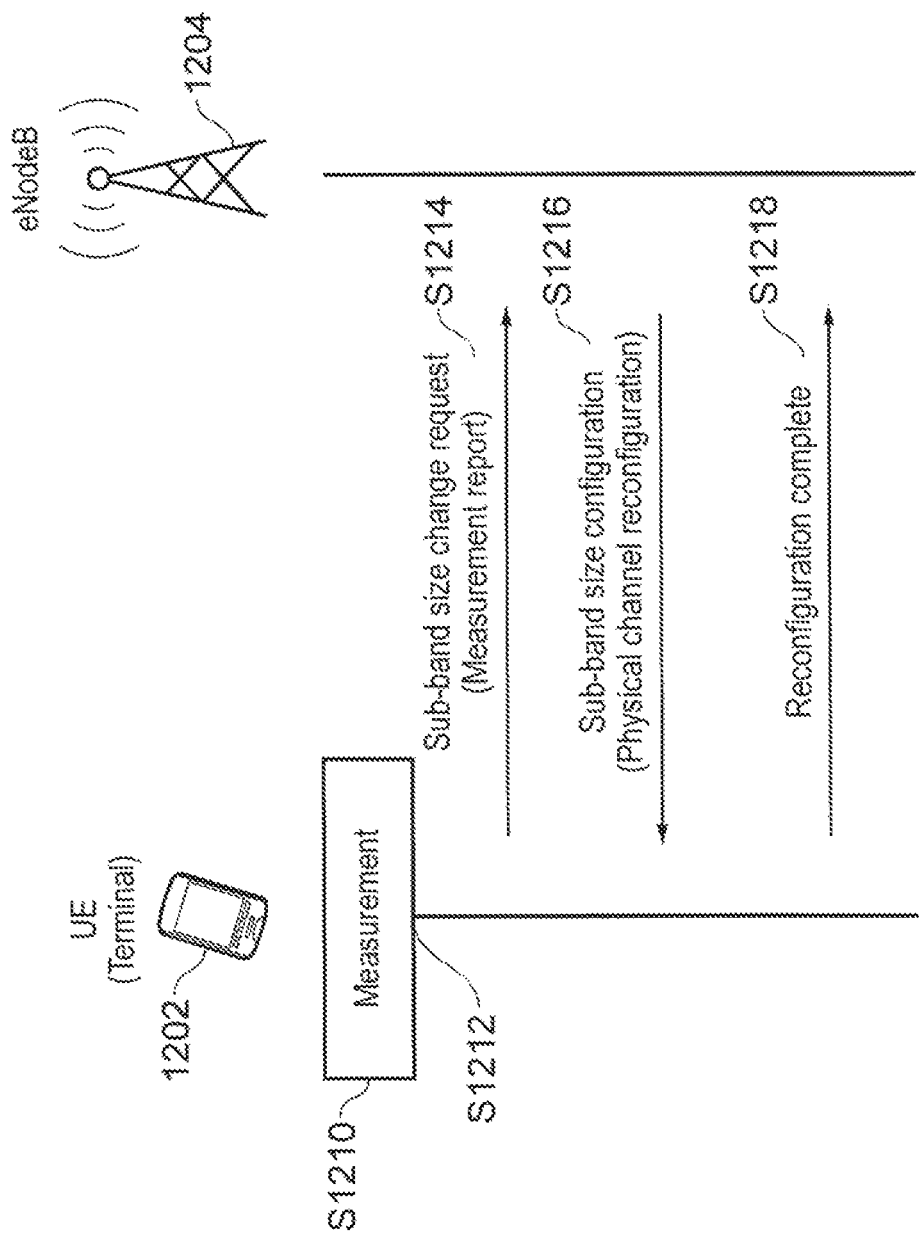
FIG. 12 illustrates the UE initiated sub-band size change procedure (using RRC)

In UE initiated case, illustrated in FIG. 12, a UE 1202 measures and decides the preferable size of sub-band, and requests this from an eNodeB 1204. The signalling is via RRC (e.g. Measurement report) and includes the following steps: measurement at UE 1202 (S1210); selection of sub-band size (S1212); transmission of change request of sub-band size (S1214); receipt of sub-band size configuration (S1216); and optionally transmission of a "reconfiguration complete" message (S1218).

RRC Signalling/eNodeB Initiated

Figure 13:
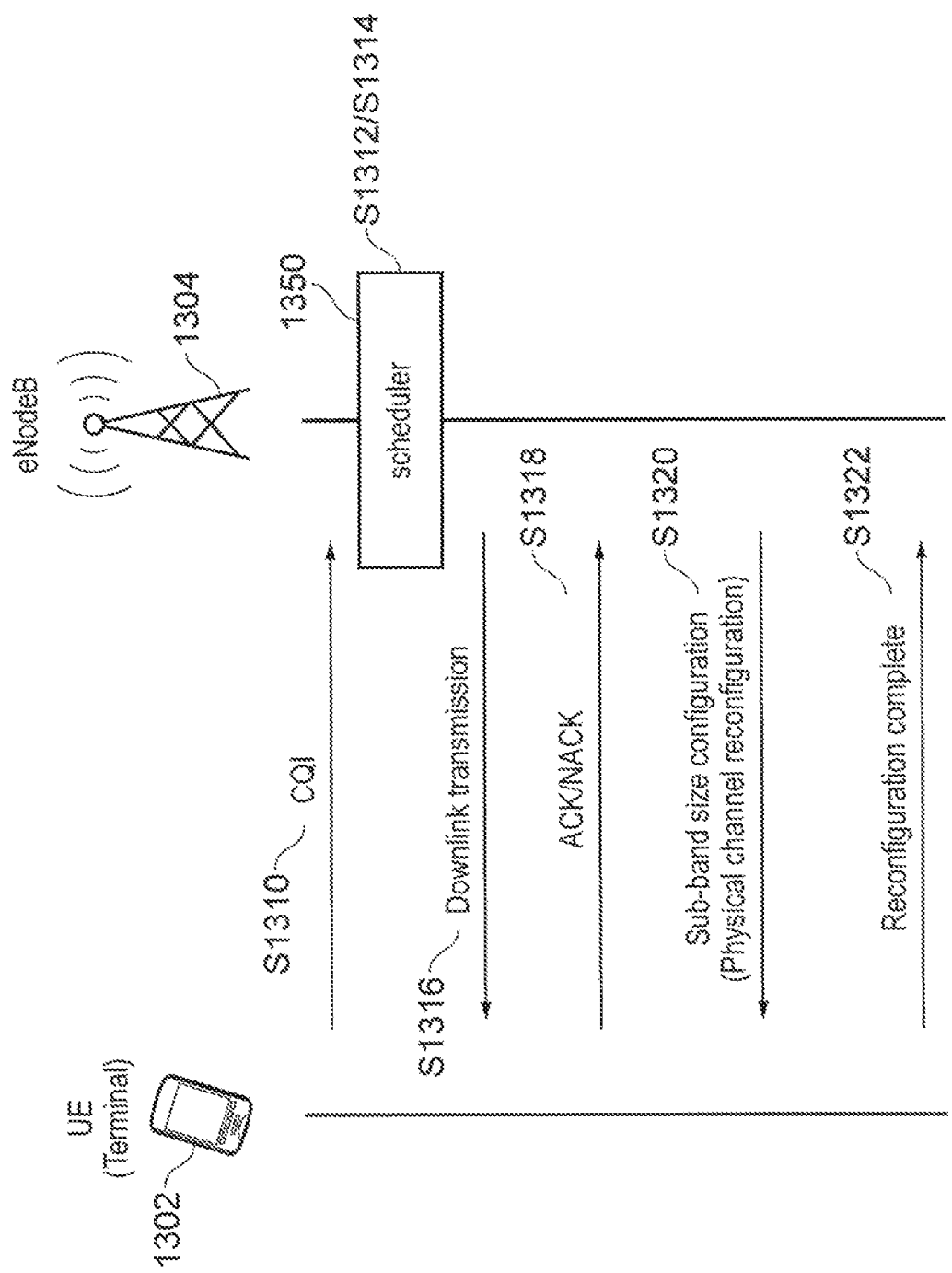
FIG. 13 illustrates an eNodeB initiated sub-band size change procedure (using RRC)
Figure 14:
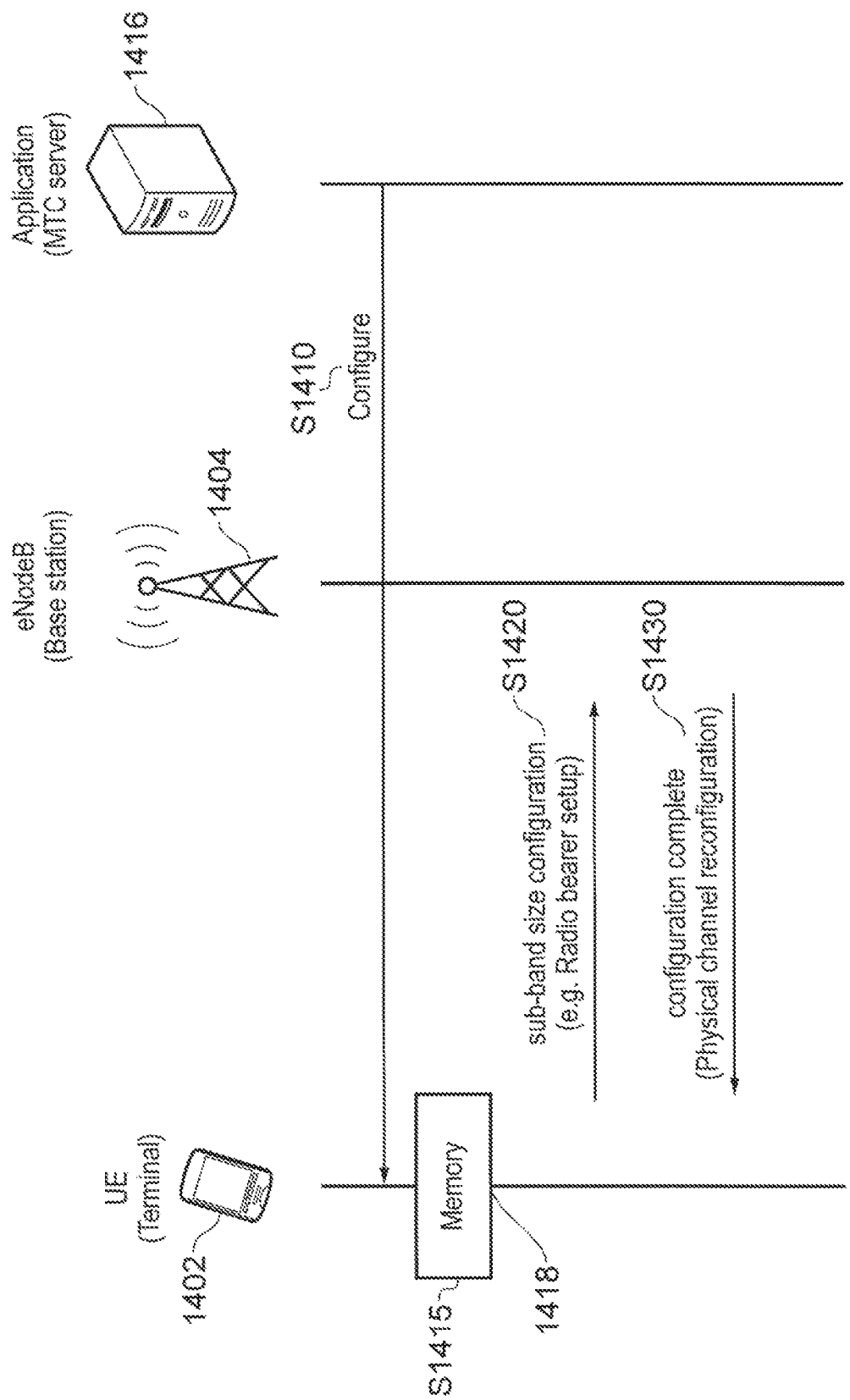
FIG. 14 illustrates MTC server initiated sub-band size change procedure.

In eNodeB initiated case, illustrated in FIG. 13, an UE 1302 reports the sub-band CQI and an eNodeB 1304 stores the values. The eNodeB includes a scheduler 1350, which decides which modulation and coding scheme (MCS) to apply and sends downlink packets to UE 1302.

The scheduler 1350 at eNodeB receives an indication of the success (or otherwise) of the decoding of these download packets via ACK/NACK (S1318). Based on these, the scheduler 1350 decides the preferable sub-band size.

Via RRC (e.g. physical channel reconfiguration, CQI report configuration), the eNodeB 1304 instructs the UE 1302 to reconfigure sub-band size to the preferable size. Upon completion the UE 1302 sends a reconfiguration complete message. The signalling proceeds as follows: the eNodeB receives CQI values from the UE (S1310); these CQI values are used in scheduling by the scheduler 1350 (S1312); downlink transmissions are scheduled by the scheduler in accordance with the CQI values (S1316), for which acknowledgements are received (S1318); where the scheduler decides sub-band size should change (S1314), the sub-band size change is instructed in a size configuration message to the UE (S1320); if faster change is needed, MAC header signalling is also applicable; and the eNodeB optionally receives a reconfiguration complete message from the UE (S1322).

RRC Signaling/Application (MTC Server) Initiated

An alternative technique, suitable for MTC devices having an associated, dedicated, MTC server 1416, is to allow the MTC server 1416 to initiate sub-band size changes at one or more or indeed all connected MTC devices. A typical procedure entails: sending a configuration message from MTC server 1416 to one or more MTC devices 1402—step S1410; sending a sub-band size change configuration from the MTC device(s) 1402 to an eNodeB 1404—step S1420—and optionally receiving a "configuration complete" message from the eNodeB 1404—step S1430.

There now follows a more detailed description of the main functional components of UEs and eNodeBs in which embodiments of the invention may suitably be implemented. Throughout the description, BB refers to Base Band, RF refers to Radio Frequency.

Hardware

UE (Terminal) Function Blocks

Figure 15:
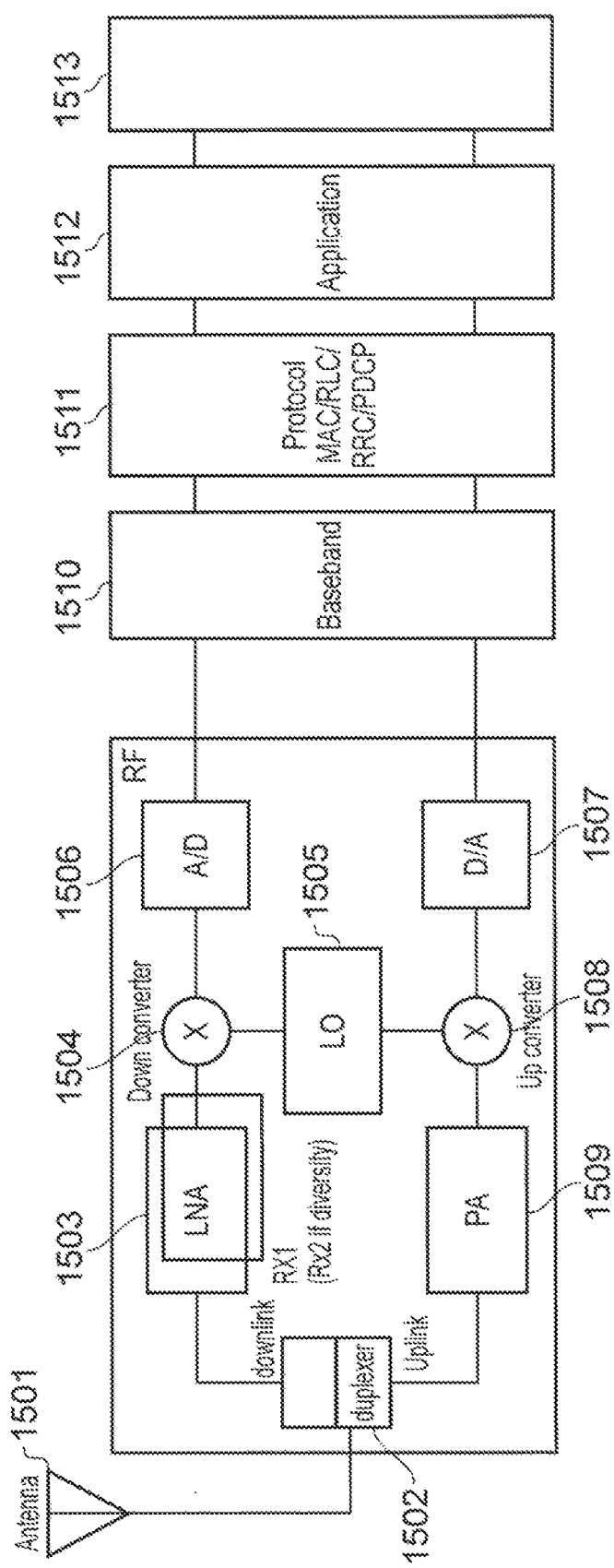
FIG. 15 schematically represents the functional constituent blocks within a typical terminal (UE)

As shown in FIG. 15, the typical terminal comprises:

an antenna arrangement 1501, which transmits and/or receives the radio signals;

a duplexer 1502, the filter to separate between uplink RF and downlink RF (FDD). In the TDD case, the duplexer is just an RF switch (switching uplink time slot and downlink time slot);

a Low Noise Amplifier (LNA) 1503, which amplifies the received signal from the antenna 1501;

a down converter 1504, which converts an RF signal to baseband (BB) signal, typically using quadrature demodulation (I/Q output). A variety of receiver architectures, e.g. direct conversion, super heterodyne etc., may be adopted to provide suitable down-conversion;

a local oscillator (LO) 1505, which re-generates a clock for demodulator, and tracking the fluctuation of frequency by AFC (Auto Frequency Control) this is also used for modulation clock;

an Analog to Digital converter (A/D) 1506, which converts analog signals to digital signals;

a Digital to Analog converter (D/A) 1507, which converts digital signal to analog signals;

an up converter 1508, which converts BB signal to RF, typically quadrature modulation (I/Q BB input to RF);

a Power amplifier (PA) or High power amplifier 1509, which amplifies RF signal from modulator to the required transmission power:

Baseband circuitry 1510, which provides the baseband processing functions (details are shown below, see FIG. 16);

Protocol circuitry 1511, which performs the processing of Layer2/3/Core Network/TCP related protocols. Typical protocols in 3GPP are: MAC; RLC; PDCP; RRC; and CN:

Application functions unit 1512, which provides various applications, including speech codec, web browsing, etc.; and optional additional units 1513, examples include BPF (Band-pass filter) which may inserted between the blocks if necessary, depending on architecture or implementation; and/or an IF filter.

UE Baseband Function Blocks

Figure 16:
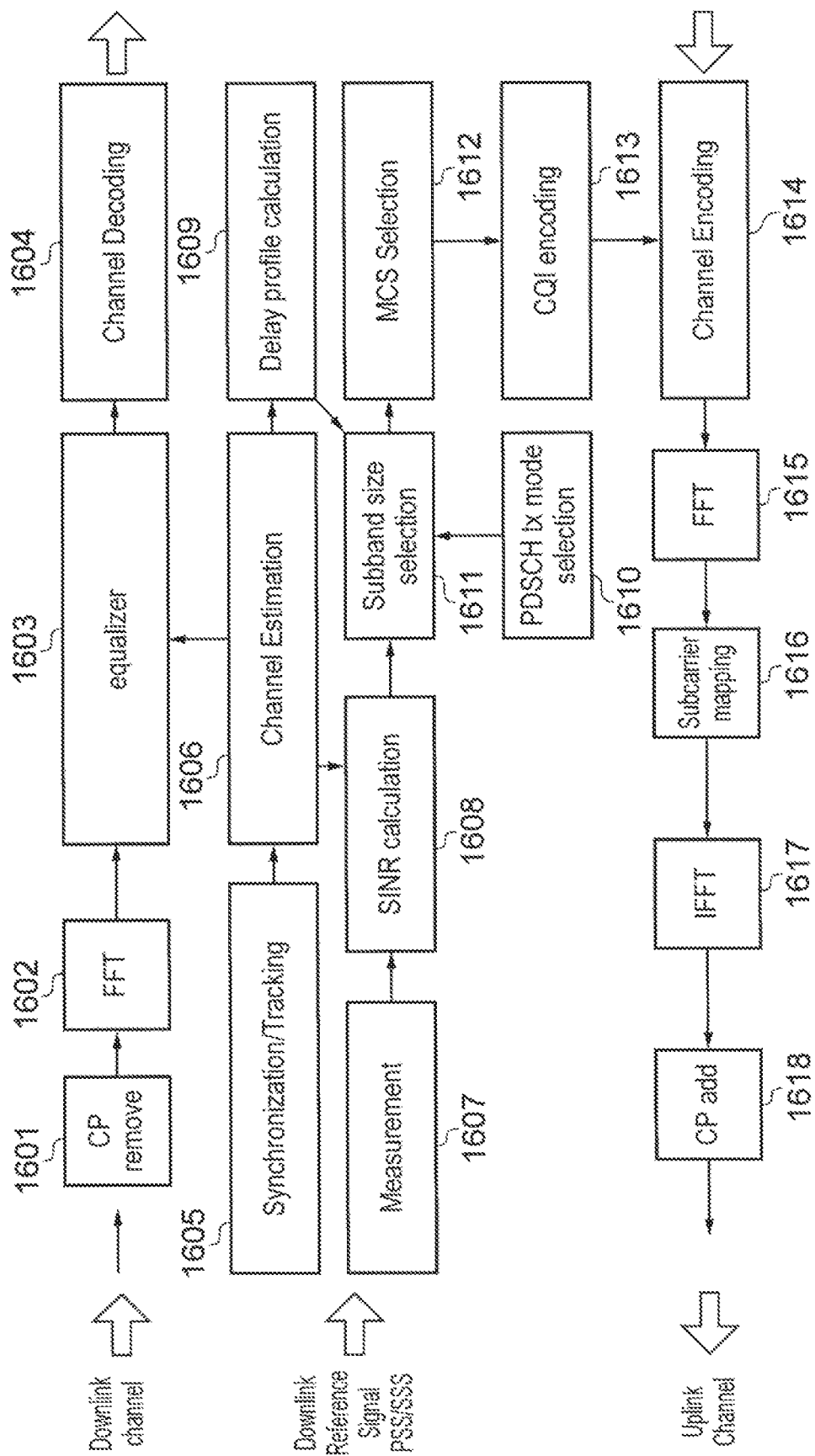
FIG. 16 illustrates the logical architecture of the baseband processing elements of a terminal.

The terminal baseband 1510, illustrated in FIG. 16, comprises the following functional blocks:

CP (Cyclic Prefix) removal unit 1601, which obtains the head of frame timing from synchronization unit and removes the Cyclic prefix from it;

FFT (Fast Fourier Transform) unit 1602 which converts time domain signal to frequency domain signal;

an equalizer unit 1603, where the signal which is effected by channel is recovered. Based on the frequency response of channel provided by channel estimation unit, the filter processing is performed;

Channel decoding unit 1604 for performing channel decoding processing such as channel de-mapping and de-interleave, error correction etc.;

Synchronization/tracking unit 1605 which performs time and frequency synchronization based on reference signal, synchronization signal (and frequency tracking, if terminal is moved);

Channel estimation unit 1606; based on reference signals, the channel of radio propagation is estimated;

Measurement unit 1607 which performs interference/signal strength measurement function (sometimes RF functions);

SINR (Signal to interference and noise ratio) processing unit 1608. Where signal strength is measured in the reference signals and interference is obtained from measurement unit, the SINR processing unit calculates the SINR (Signal to Noise+interference ratio) based on these values;

Delay profile calculation unit 1609, in which the channel estimates are aggregated to determine a delay profile;

PDSCH transmission (Tx) mode selection 1610; wherein, based on eNodeB direction, PDSCH mode is selected;

Sub-band size selector 1611. Based on one or more of the sub-band size selection methods described above: i.e. static table look-up, semi-static size selection; SINR, or channel condition (e.g. delay profile, PDSCH Tx mode, etc.), a suitable sub-band size is selected. The selected sub-band size is output as the recommended sub-band size for use in the CQI signalling from the UE;

MCS (Modulation and Coding scheme) selection unit 1612, which selects the preferable MCS based on current downlink channel quality;

CQI encoding unit 1613;

Channel encoding unit 1614 for encoding the channels into resources, multiplexing the indicators (e.g. CQI);

FFT (Fast Fourier Transform) unit 1615, which converts time domain signals to frequency domain signals;

Subcarrier mapping unit 1616, for performing the mapping of the subcarriers to be transmitted based on scheduler's grant indication;

IFFT (Inverse Fast Fourier Transform) 1617 which converts frequency domain signals to time domain signals; and CP (cyclic prefix) addition unit 1618 which inserts cyclic prefix at the head of frame; in preparation for uplink transmission.

Depending upon implementation other functional blocks may be provided such as S/P (serial to parallel), P/S (parallel to Serial) conversion function, which would be inserted for OFDM signal generation/regeneration.

ENodeB (Base Station) Function Blocks

Figure 17:
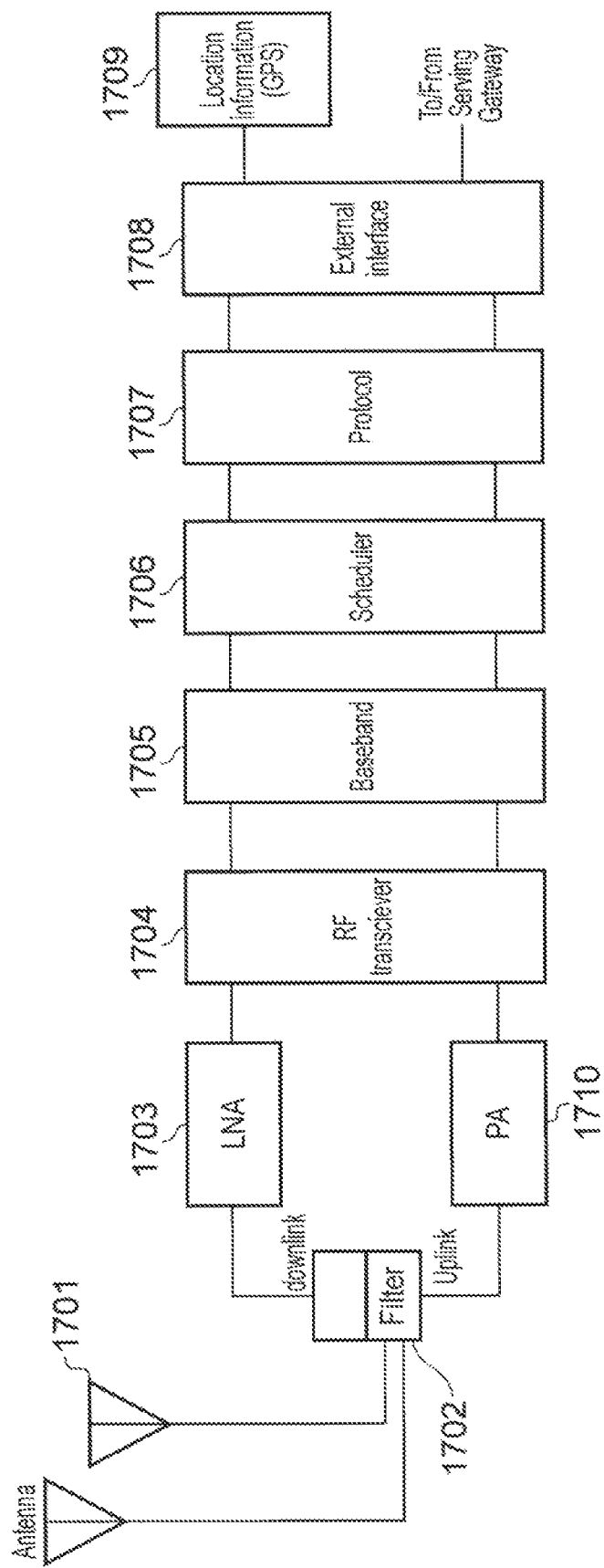
FIG. 17 schematically represents the functional constituent blocks within a typical eNodeB.

As shown in FIG. 17, the typical base station (eNodeB) comprises:

an antenna arrangement 1701, which transmits and receives radio signals. Typically more than one antenna element is provided for diversity/MIMO transmission;

an RF filter 1702; which separates the RF between uplink RF and downlink RF (FDD) or frequency bands (e.g. 800 MHz, 2.1 GHz);

an LNA (Low Noise Amplifier) 1703 which amplifies the received signal from antenna;

RF transceiver 1704 which up converts from BB to RF, and down converts from RF to BB as required;

Baseband circuitry 1705 which provides the baseband functionality such as channel coding/decoding, modulation/demodulation, channel estimation, equalization etc. (discussed in more detail in the description of FIG. 18 below);

Scheduler 1706 for scheduling the downlink data/uplink data for a UE based on CQI report and measurement of internal resources (power, buffer status, interference etc.);

Protocol circuitry 1707 for performing the processing of Layer2/3/Core Network/TCP related protocols—typical protocols in 3GPP are MAC (Media Access Control), RLC (Radio Link Control), PDCP (Packet data compressed protocol), and RRC (Radio Resource control);

External interface 1708, which provides the interface to external nodes such as Si (from/to Core Network) and X2 (from/to other eNodeBs);

Location information circuitry 1709, which obtain location information. This is an optional functionality. e.g. GPS global positioning system or another location measurement.

PA (Power amplifier or High power amplifier) 1710 which amplifies RF signals from RF transceiver to the required transmission power.

Note; these are logical functions. They are sometimes provided in physically separated apparatus. For example, RRH (Radio remote Header) may split the RF function from main base station and install it in another location some distance from the main base station.

The antenna arrangement 1701 is usually located on the mast/tower or top of the roof and connected with feeder.

The baseband 1705, scheduling 1706 and protocol 1707 functions may be installed into one cabinet, the remaining functions may be installed outside the base station.

eNodeB Baseband Function Blocks

Figure 18:
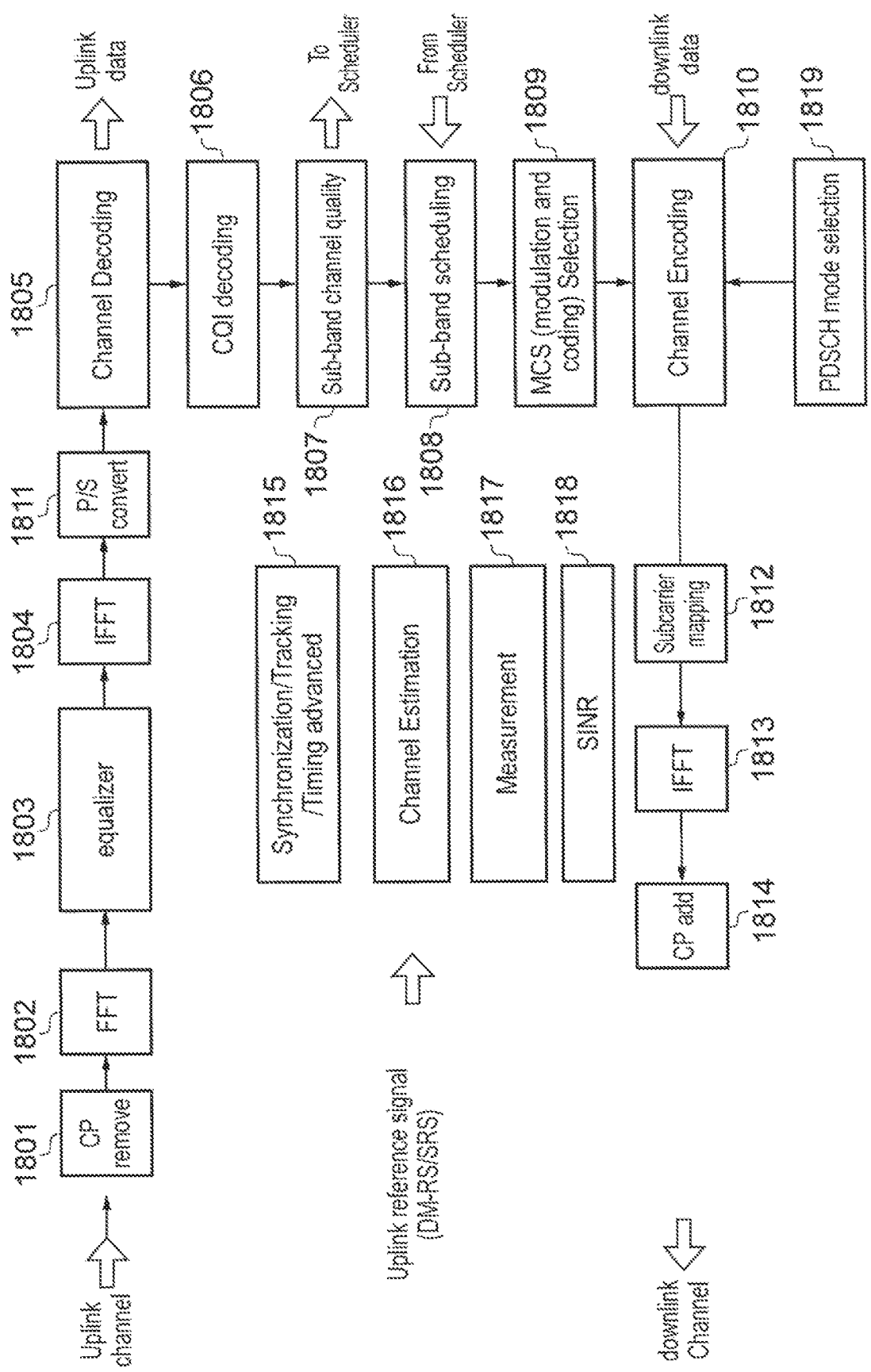
FIG. 18 illustrates the logical architecture of the baseband processing elements of a base station.

The base station baseband, illustrated in FIG. 18, comprises:

CP (Cyclic Prefix) removal unit 1801, which identify the head of frame from synchronization unit and removes the cyclic prefix from it;

FFT (Fast Fourier transform) unit 1802, which converts time domain signals to frequency domain signals;

Equalizer unit 1803, where the signal which is effected by channel is recovered (amplitude and phase);

IFFT (Inverse Fast Fourier transform) unit 1804 which converts frequency domain signals to time domain signals;

P/S (Parallel to Serial) conversion unit 1811 which provides a conversion function for OFDM signal generation;

Channel decoding unit 1805, which performs channel decoding like de-mapping and de-interleave, error correction etc;

CQI decoding unit 1806, which de-multiplexes the control signals and the decoding CQI;

sub-band channel quality unit 1807, which obtains the sub-band channel quality values and outputs them to the scheduler;

Sub-band scheduling unit 1808, which delivers the output schedule from scheduler;

MCS (Modulation and Coding scheme) selection unit 1809, which selects the MCS based on current CQI of sub-band;

Channel encoding unit 1810, for encoding the channels into resources, including indicator (e.g. CQI);

Subcarrier mapping unit 1812, which maps the subcarriers to be transmitted based on scheduler's indication of resource allocation;

IFFT (Inverse Fast Fourier Transform) unit 1813 for converting frequency domain signals to time domain signals;

CP (cyclic prefix) addition unit 1814, which inserts a cyclic prefix at the head of frame in preparation for downlink transmission;

Synchronization/tracking/timing advance module 1815, which carries out the time and frequency synchronization based on reference signal, synchronization signal, etc. (and frequency tracking, if terminal is moved);

Channel estimation module 1816, which based on reference signal, estimates the channel of radio propagation:

Measurement unit 1817, where interference/signal strength measurement function is performed (sometimes RF functions)

SINR (Signal to interference ratio) unit 1818, which performs interference measurement function (sometimes RF functions); and PDSCH transmission mode selection unit 1819, which selects PDSCH mode based on eNodeB direction.

Other functional blocks may be provided thus S/P (serial to parallel) conversion function is inserted for OFDM signal generation.

Network Structure

As was briefly discussed in relation to FIG. 1, an LTE/SAE network has a number of essential components. In many MTC applications further functional entities are required. An MTC network system may comprise:

MTC terminals 102—UEs which have MTC functions;

eNodeB/eNB 104—base station for both MTC and non-MTC devices, this is also a function of LTE (Host carrier);

Serving gateway (S-GW) 112—for providing user plane function of LTE/SAE, Packet routing and forwarding, mobility anchoring, this is the gateway between Core network (non-access substratum, NAS) entities and Radio Access network (RAN)

PDN (Packet Data Network) gateway (P-GW) 114—for providing user plane function of LTE/SAE such as UE IP address allocation, packet filtering, EPS bearer configuration. This is the gateway between core network and Packet Data Network (e.g. external 3GPP networks, other internetworks).

MME (Mobility Management Entity) 106—for providing control plane function of LTE/SAE such as NAS signalling, security, Idle mode UE Reachability, PDN GW and Serving GW selection.

HSS (Home Subscriber server) 108—the database of subscribers including information such as user identifier, key, connected P-GW, the tracking area information (allowing a UE to be located with the coverage of the network) MTC (Machine type communication) Server 116—the server of MTC functions MTC gateway 120 (optional); this represents a gateway between 3GPP/LTE and non LTE MTC terminals (e.g. LTE to Zigbee interface). The gateway runs M2M Application(s) using M2M Service Capabilities. The Gateway acts as a proxy between M2M Devices and the Network Domain. The M2M Gateway may provide service to other devices (e.g. legacy) connected to it that are hidden from the Network Domain. As an example, an M2M Gateway may run an application that collects and treats various information (e.g. from sensors and contextual parameters). [ETSI TS.102. 690 V1.1.1 gives further details of the functionalities of MTC gateways].

Protocol Structure

Figure 19:
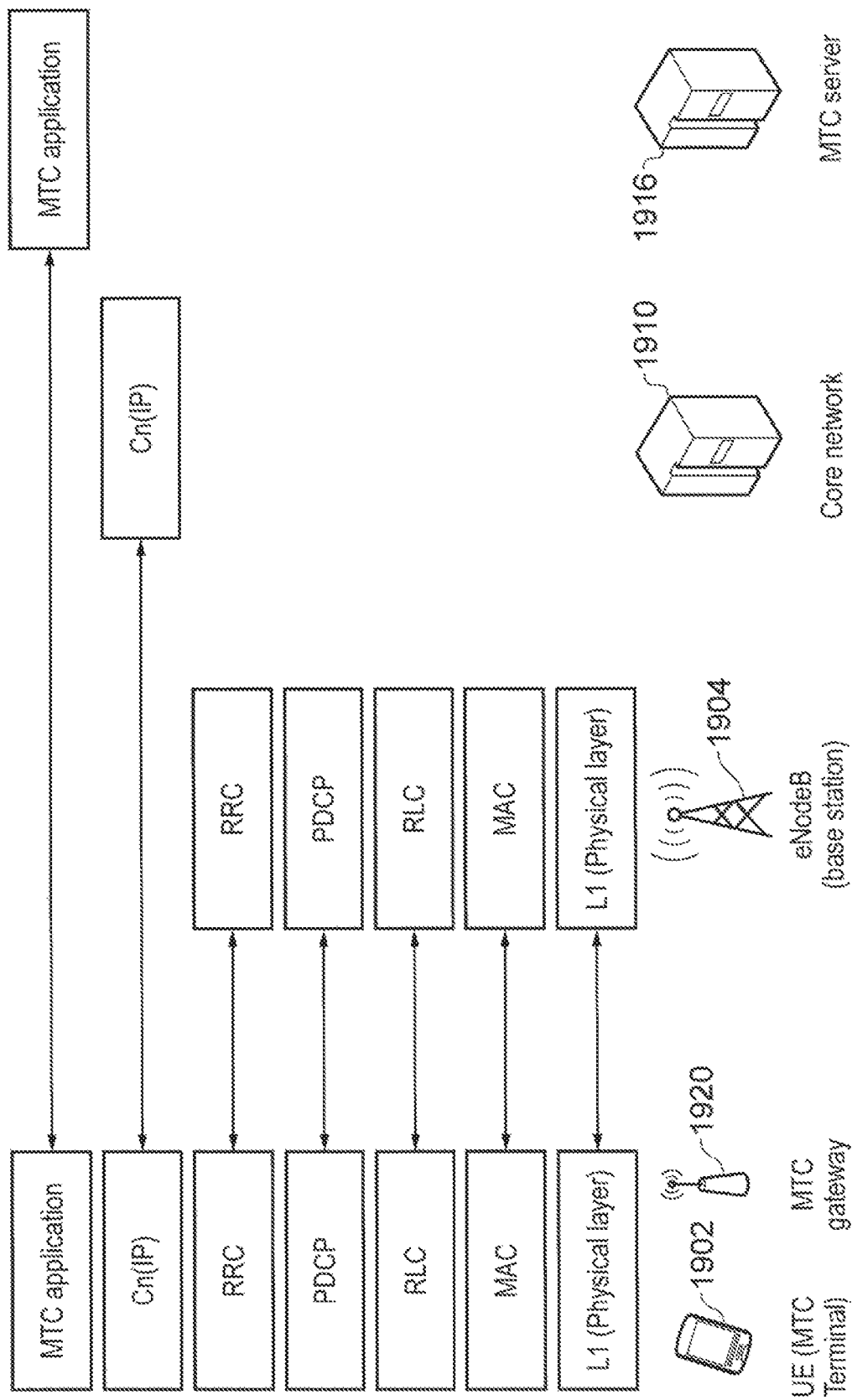
FIG. 19 illustrates the protocol stack for an LTE/SAE/MTC architecture.

The LTE/SAE/MTC protocol stack is illustrated in FIG. 19. The protocol stack comprises:

1. L1 (Layer1) Physical layer processing like modulation/demodulation, channel coding/decoding.
2. MAC (Media Access Control) Hybrid ARQ, scheduling (eNodeB)
3. RLC(Radio Link Control) ARQ Retransmission 4. PDCP(Packet Data Convergence Protocol) packet header reduction/recovery
5. RRC(Radio Resource control) controlling signalling of radio resources.

These are a part of the radio access network (RAN)
6. CN(Core Network); core network functions such as mobility management, tunneling protocol, session management, bearer management. QoS, security functions
7. MTC application; application for MTC functions UEs 1902 and other terminals in the network, such as MTC gateways 1920, share the same basic protocol stack: physical (L1/PHY), MAC, RLC, PDCP and RRC. The terminals 1902, 1920 share the core network protocol—typically an Internet Protocol, IP—with the Core Network 1910. A further protocol layer (referred to as the MTC application layer) is provided to facilitate communication between MTC devices/gateways 1902/1920 and an MTC server 1916.

MTC Features

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc.

Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive: in addition MTC-devices are often deployed in situations that do not afford easy access for direct maintenance or replacement—reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier, for at least some part of a subframe. Accordingly, data transmitted on the virtual carrier can be received and decoded using a reduced complexity receiver unit.

The term "virtual carrier" corresponds in essence to a narrowband carrier for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. For ease of reference, however, an overview of certain aspects of the concept of virtual carriers is set out in Annex 1.

Other Narrowband Scenarios

While the preceding discussion of narrowband system bandwidths (i.e. system bandwidths below 6RBs in frequency where conventional systems do not provide subband CQI reports) have related to "virtual carrier" systems, especially when considering the "6RBs" case, the reader will readily appreciate that the same considerations apply equally to other cases where the system bandwidth is limited, for instance to 5 MHz.

Annex 1

The virtual carrier concept is described in a number of co-pending UK patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]). Certain aspects of the concept of virtual carriers are set out below. In this section, the following abbreviations are frequently adopted: virtual carrier—VC, host carrier—HC, user equipment—UE, resource block—RB, radio frequency—RF, and baseband—BB.

Like conventional OFDM, the virtual carrier concept has a plurality of subcarriers disposed at predetermined offsets from a central frequency: the central frequency thus characterises the entire virtual carrier.

Typical virtual carrier bandwidth is six resource blocks, (i.e. 72 subcarriers) which is in line with minimum 3GPP bandwidth in LTE. However, as will be seen in the following description, the bandwidth of VC is by no means restricted to 6RBs.

In line with Release 8 of the 3GPP standard for LTE (REL8 LTE), VC resources are typically located in the resource blocks centred on the host carrier centre frequency and symmetrically allocated (at either side of that HC centre frequency) regardless of system bandwidth.

Figure 20:
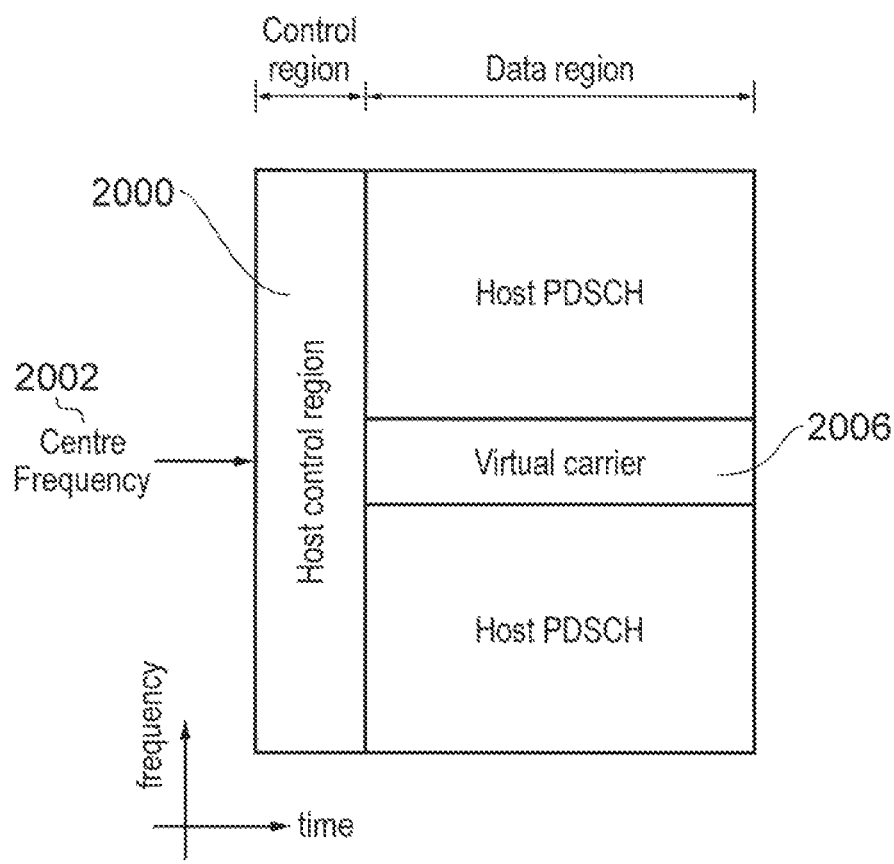
FIG. 20 shows a virtual carrier coexisting in a host carrier

FIG. 20 is a schematic diagram of a grid which illustrates the structure of a downlink LTE subframe with a virtual carrier subsystem 2006 occupying the resource blocks centred on the host carrier centre frequency 2002. The virtual carrier central frequency, $(f2+f1)/2$, is selected to be the central frequency, fc, of the host carrier.

The first n symbols form the control region 2000 which is reserved for the transmission of downlink control data such as data transmitted on the PDCCH, PCFICH or PHICH.

The signals on the virtual carrier 2006 are arranged such that signals transmitted by the host carrier that a terminal device operating on the host carrier would require for correct operation and expect to find in a known pre-determined location are maintained.

Before a conventional LTE terminal can begin transmitting and receiving data in a cell, it first camps on to the cell. Similarly, an adapted camp-on process can be provided for terminals using the virtual carrier. A suitable camp-on process for virtual carriers is described in detail in GB 1113801.3 [10]: this camp-on process is incorporated herein by reference.

In the T-shaped operation of FIG. 20, the virtual carrier location information, if provided, can be provided elsewhere in the host carrier. In other implementations of virtual carriers it may be advantageous to provide this information in the centre band, for example because a virtual carrier terminal may configure its receiver to operate in a narrow band about the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). This process too is discussed in detail in GB 1113801.3 [10].

The following numbered clauses provide further example aspects and features of the present technique:

1. A method for reporting channel state information corresponding to a communication link between a terminal device and a base station in a wireless communications system, the wireless communication system having a system bandwidth divided into a plurality of sub-band parts having at least one characteristic sub-band size, the method comprising:

providing a plurality of communications resource elements across the system bandwidth;

measuring one or more channel state parameter corresponding to the channel state in one or more of the communications resource elements;

generating aggregate channel state information from at least one measured channel state parameter corresponding to the channel state of the communications resource elements, generating sub-band channel state information from at least one measured channel state parameter corresponding to the channel state of the communications resource elements within respective sub-band parts, wherein the size of the sub-band part is dependent upon radio propagation conditions.

2. A method according to clause 1, the wireless communication system further having a subsystem bandwidth divided into a plurality of subsystem sub-band parts, the method further comprising:

providing a plurality of subsystem communications resource elements across the subsystem bandwidth;

generating subsystem channel state information from at least one measured channel state parameter corresponding to the channel state of the subsystem communications resource elements, generating subsystem sub-band channel state information from at least one measured channel state parameter corresponding to the channel state of the communications resource elements within respective subsystem sub-band parts, wherein the size of the subsystem sub-band part is dependent upon radio propagation conditions.

3. A method according to clause 1 or 2, wherein the size of the sub-band part is broadcast in radio resource signalling.

4. A method according to clause 1 or 2,
wherein the method further comprises:
determining at least one category of radio propagation condition associated with the communication link;
providing a lookup table listing sub-band sizes corresponding to category of radio propagation conditions; and
selecting the sub-band size associated with the determined category communication link;
providing a lookup table listing sub-band sizes corresponding to category of radio propagation conditions; and
selecting the sub-band size associated with the determined category.

5. A method according to clause 4, wherein the categorised radio propagation conditions include at least one radio propagation condition selected from a group of radio propagation conditions including:
a site type of the base station;
a morphology type of the base station location;
a mobility type of the terminal device; and
an indicator of the type of base station.

6. A method according to any preceding clause, wherein the method further comprises:
determining at least one category of ambient radio propagation condition;
calculating a sub-band size in accordance with at least one ambient radio propagation condition; and
selecting the sub-band size associated with the determined category.

7. A method according to clause 8, wherein the categorised ambient radio propagation condition include at least one radio propagation condition selected from a group of ambient radio propagation conditions including:
a measure of delay spread;
a SINR measurement; and
an indicator of the transmission mode of a downlink data channel.

8. A method according to any of clauses 1 to 5, wherein the method further comprises:
measuring at least one radio propagation characteristic experienced by a UE;
calculating a dynamic sub-band size in accordance with the measured radio propagation characteristic; and
using the dynamic sub-band size as the sub-band size for a predetermined period of time.

9. A method according to clause 8, wherein the measured radio propagation characteristic includes at least one radio propagation characteristic selected from a group of measured parameters including:
a measure of delay spread;
a SINR measurement; and
an indicator of the transmission mode of a downlink data channel.

10. A method according to any preceding clause, further comprising signalling a change of size of the sub-band part, wherein the change of sub-band size corresponding to a change in radio propagation conditions is indicated in L1 signalling.

11. A method according to any of clauses 1 to 9, further comprising signalling a change of size of the sub-band part, wherein the change of sub-band size corresponding to a change in radio propagation conditions is indicated in radio resource signalling.

12. A method according to any preceding clause, wherein the plurality of sub-band parts have a plurality of characteristic sub-band sizes, at least a first group of the sub-band parts having a first characteristic sub-band size and a second group of the sub-band parts having a second characteristic sub-band size, the first characteristic sub-band size and second characteristic sub-band size being different, thereby facilitating reporting channel state information at different degrees of granularity for different parts of the system bandwidth.

13. A terminal device for reporting channel state information corresponding to a communication link to a base station in a wireless communications system, the wireless communication system having an system bandwidth divided into a plurality of sub-band parts having at least one characteristic sub-band size and providing a plurality of communications resource elements across the system bandwidth, the terminal device comprising:

a measurement unit operable to measure one or more channel state parameter corresponding to the channel state in one or more of the communications resource elements; and a processing unit operable to generate aggregate channel state information from at least one measured channel state parameter corresponding to the channel state of the communications resource elements, and to generate sub-band channel state information from at least one measured channel state parameter corresponding to the channel state of the communications resource elements within respective sub-band parts, wherein the size of the sub-band part is dependent upon radio propagation conditions.

14. A terminal device according to clause 13, the wireless communication system further having a subsystem bandwidth divided into a plurality of subsystem sub-band parts and providing a plurality of subsystem communications resource elements across the subsystem bandwidth, wherein the processing unit is further operable to generate subsystem channel state information from at least one measured channel state parameter corresponding to the channel state of the subsystem communications resource elements, and to generate subsystem sub-band channel state information from at least one measured channel state parameter corresponding to the channel state of the communications resource elements within respective subsystem sub-band parts, wherein the size of the subsystem sub-band part is dependent upon radio propagation conditions.

15. A terminal device according to clause 13 or 14, further comprising protocol circuitry adapted to prepare uplink signals conforming to the radio resource control, RRC, protocol, wherein the size of the sub-band part is broadcast in radio resource signalling.

16. A terminal device according to clause 13 or 14, the terminal device further comprising a sub-band size selector adapted to determine at least one category of radio propagation condition associated with the communication link; the sub-band size selector including a database storing a lookup table listing sub-band sizes corresponding to category of radio propagation conditions; wherein the sub-band size selector defines the sub-band size to be the sub-band size associated with the determined category.

17. A terminal device according to clause 16, wherein the categorised radio propagation conditions include at least one radio propagation condition selected from a group of radio propagation conditions including:

a site type of the base station;

a morphology type of the base station location;

a mobility type of the terminal device; and an indicator of the type of base station.

18. A terminal device according to clause 13 or 14, the terminal device further comprising a sub-band size selector adapted to determine at least one category of ambient radio propagation condition, the sub-band size selector calculating a sub-band size in accordance with the determined category of at least one ambient radio propagation condition; wherein the sub-band size selector defines the sub-band size to be the sub-band size associated with the determined category.

19. A terminal device according to clause 18, wherein the categorised ambient radio propagation condition includes at least one radio propagation condition selected from a group of ambient radio propagation conditions including:

a measure of delay spread;

a SINR measurement; and an indicator of the transmission mode of a downlink data channel.

20. A terminal device according to clause 13 or 14, wherein the measurement unit is further operable to measure at least one radio propagation characteristic experienced by the terminal device; and the terminal device further comprising a sub-band size selector adapted to calculate a dynamic sub-band size in accordance with the measured radio propagation characteristic and to use the dynamic sub-band size as the sub-band size for a predetermined period of time.

21. A terminal device according to clause 20, wherein the measured radio propagation characteristic includes at least one radio propagation characteristic selected from a group of measured parameters including:

a measure of delay spread;

a SINR measurement; and an indicator of the transmission mode of a downlink data channel.

22. A terminal device according to any of clauses 13 to 21, further comprising means for signalling a change of size of the sub-band part and protocol circuitry adapted to prepare uplink signals conforming to a layer 1, L, protocol, wherein the change of sub-band size corresponding to a change in radio propagation conditions is indicated in L1 signalling.

23. A terminal device according to any of clauses 13 to 21, further comprising means for signalling a change of size of the sub-band part and protocol circuitry adapted to prepare uplink signals conforming to the radio resource control, RRC, protocol, wherein the change of sub-band size corresponding to a change in radio propagation conditions is indicated in radio resource signalling.

24. A terminal device according to any of clauses 13 to 23, wherein the plurality of sub-band parts have a plurality of characteristic sub-band sizes, at least a first group of the sub-band parts having a first characteristic sub-band size and a second group of the sub-band parts having a second characteristic sub-band size, the first characteristic sub-band size and second characteristic sub-band size being different, thereby facilitating reporting channel state information at different degrees of granularity for different parts of the system bandwidth.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3
[11] UK patent application GB 1121767.6

The invention claimed is:

1. A terminal device for reporting channel state information corresponding to a communication link to a base station in a wireless communications system, the wireless communication system having an system bandwidth divided into a plurality of sub-band parts having at least one characteristic sub-band size and providing a plurality of communications resource elements across the system bandwidth, the terminal device comprising:
circuitry configured to
measure one or more channel state parameter corresponding to a channel state in one or more of the communications resource elements;
generate aggregate channel state information from at least one measured channel state parameter corresponding to the channel state in said one or more of the communications resource elements, and generate sub-band channel state information from at least one measured channel state parameter corresponding to the channel state in said one or more of the communications resource elements within respective ones of the plurality of sub-band parts; and
set a size of each of the plurality of sub-band parts to be dependent upon radio propagation conditions including at least one radio propagation condition selected from a group of radio propagation conditions including:
a site type of the base station;
a morphology type of a location of the base station;
a mobility type of the terminal device; and
an indicator of a type of base station.

2. The terminal device as claimed in claim 1, the wireless communication system further having a subsystem bandwidth divided into a plurality of subsystem sub-band parts and providing a plurality of subsystem communications resource elements across the subsystem bandwidth,
wherein the circuitry is further configured to generate subsystem channel state information from at least one measured channel state parameter corresponding to a channel state of the subsystem communications resource elements, and
to generate subsystem sub-band channel state information from at least one measured channel state parameter corresponding to a channel state of communications resource elements within respective subsystem sub-band parts,
wherein a size of each of the plurality of subsystem sub-band parts is dependent upon radio propagation conditions.

3. The terminal device as claimed in claim 1, wherein the circuitry is further configured to prepare uplink signals conforming to the radio resource control (RRC) protocol.

4. The terminal device as claimed in claim 1, wherein the circuitry is further configured to determine at least one category of radio propagation condition associated with the communication link; the circuitry storing a database storing a lookup table listing sub-band sizes corresponding to category of radio propagation conditions.

5. The terminal device as claimed in claim 1, wherein the circuitry is further configured to determine at least one category of ambient radio propagation condition, the circuitry calculating a sub-band size in accordance with the determined at least one category of ambient radio propagation condition; wherein the circuitry defines the sub-band size to be the sub-band size calculated in accordance with the determined at least one category of ambient radio propagation condition.

6. The terminal device as claimed in claim 5, wherein the ambient radio propagation condition further includes at least one radio propagation condition selected from a group of ambient radio propagation conditions including:
a signal to interference plus noise ratio (SINR) measurement; and
an indicator of a transmission mode of a downlink data channel.

7. The terminal device as claimed in claim 1, wherein the circuitry is further configured to
measure at least one radio propagation characteristic experienced by the terminal device, and
calculate a dynamic sub-band size in accordance with the measured at least one radio propagation characteristic and to use the dynamic sub-band size as a sub band size for a predetermined period of time.

8. The terminal device as claimed in claim 7, wherein the measured at least one radio propagation characteristic includes at least one radio propagation characteristic selected from a group of measured parameters including:
a signal to interference and noise ratio (SINR) measurement; and
an indicator of a transmission mode of a downlink data channel.

9. The terminal device as claimed in claim 1, wherein the circuitry is further configured to signal a change of sub-band size and prepare uplink signals conforming to a layer 1 (L1) protocol and to indicate the change of sub-band size corresponding to a change in radio propagation conditions in L1 signaling.

10. The terminal device as claimed in claim 1, wherein the circuitry is further configured to signal a change of sub-band size and prepare uplink signals conforming to the radio resource control (RRC) protocol and to indicate the change of sub-band size corresponding to a change in radio propagation conditions in radio resource signaling.

11. The terminal device as claimed in claim 1, wherein the plurality of sub-band parts have a plurality of characteristic sub-band sizes, at least a first group of the plurality of sub-band parts having a first characteristic sub-band size and a second group of the sub-band parts having a second characteristic sub-band size, the first characteristic sub-band size and the second characteristic sub-band size being different, thereby facilitating reporting channel state information at different degrees of granularity for different parts of the system bandwidth.

* * * * *